(12) United States Patent
Song et al.

(10) Patent No.: US 10,726,503 B2
(45) Date of Patent: Jul. 28, 2020

(54) METHOD AND APPARATUS FOR PROVIDING CROWDSOURCING SERVICES

(71) Applicant: Samsung Electronics Co., Ltd., Suwon-si (KR)

(72) Inventors: Seongwook Song, Seoul (KR); Seungwon Choi, Hwaseong-si (KR); Jonghan Lim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1067 days.

(21) Appl. No.: 15/053,614

(22) Filed: Feb. 25, 2016

(65) Prior Publication Data

US 2017/0228830 A1    Aug. 10, 2017

(30) Foreign Application Priority Data

Feb. 5, 2016    (KR) ........................ 10-2016-0014784

(51) Int. Cl.
| | | |
|---|---|---|
| *H04W 24/00* | (2009.01) | |
| *G06Q 50/00* | (2012.01) | |
| *H04L 12/26* | (2006.01) | |
| *G06Q 20/32* | (2012.01) | |
| *G06Q 30/02* | (2012.01) | |

(52) U.S. Cl.
CPC ......... *G06Q 50/01* (2013.01); *G06Q 20/3224* (2013.01); *G06Q 20/3278* (2013.01); *G06Q 30/0279* (2013.01); *H04L 43/106* (2013.01); *H04L 43/50* (2013.01)

(58) Field of Classification Search
CPC ........... G06Q 20/3224; G06Q 20/3278; G06Q 30/0279; G06Q 50/01; G06Q 20/16; G06Q 20/32; G06Q 20/382; H04L 43/106; H04L 43/50; H04W 48/16; H04W 4/008; H04W 4/023

USPC ...................................... 455/456.1
See application file for complete search history.

(56) References Cited

U.S. PATENT DOCUMENTS

| | | |
|---|---|---|
| 7,509,131 B2 | 3/2009 | Krumm et al. |
| 8,498,811 B2 | 7/2013 | Lundquist et al. |
| 8,559,370 B2 | 10/2013 | Kim et al. |
| 8,566,233 B2 | 10/2013 | Prakash et al. |
| 9,037,489 B2 | 5/2015 | Jeong |

(Continued)

FOREIGN PATENT DOCUMENTS

| | | |
|---|---|---|
| KR | 10-2012-0002784 | 1/2012 |
| KR | 10-2015-0053311 | 5/2015 |

(Continued)

*Primary Examiner* — Charles T Shedrick
(74) *Attorney, Agent, or Firm* — H.C. Park & Associates, PLC

(57) ABSTRACT

A system-on-chip (SoC) including: a first interface; and at least one application processor, configured to: receive location information from a communicator, the location information being associated with an electronic transaction; receive an identification of at least one access point from the communicator, the at least one access point being accessible to the communicator; generate an association data set including the location information and the identification of the access point; and transmit the association data set to the communicator, wherein the first interface is configured to provide communication between the at least one application processor and the communicator.

14 Claims, 24 Drawing Sheets

(56) References Cited

U.S. PATENT DOCUMENTS

| | | |
|---|---|---|
| 9,084,122 B2 | 7/2015 | Gao et al. |
| 9,210,543 B2 | 12/2015 | Shin et al. |
| 9,247,392 B2 | 1/2016 | Raghupathy et al. |
| 9,491,655 B2* | 11/2016 | Gao ................... H04W 4/025 |
| 9,615,347 B1* | 4/2017 | Kerr ..................... H04W 64/00 |
| 2003/0118015 A1* | 6/2003 | Gunnarsson .......... H04W 48/16 |
| | | 370/389 |
| 2008/0248815 A1* | 10/2008 | Busch ................... H04L 67/18 |
| | | 455/456.5 |
| 2009/0247170 A1* | 10/2009 | Balasubramanian ....................... |
| | | H04W 48/16 |
| | | 455/445 |
| 2010/0232401 A1* | 9/2010 | Hirsch ................. H04W 48/16 |
| | | 370/338 |
| 2011/0165892 A1* | 7/2011 | Ristich ................. H04W 64/00 |
| | | 455/456.2 |
| 2012/0028654 A1* | 2/2012 | Gupta ................. G01C 21/206 |
| | | 455/456.3 |
| 2012/0094597 A1* | 4/2012 | Tysowski ............. G06Q 10/10 |
| | | 455/41.1 |
| 2012/0194382 A1* | 8/2012 | Anderson ............... G01S 19/34 |
| | | 342/357.29 |
| 2013/0023282 A1* | 1/2013 | Lin ........................ G01S 5/021 |
| | | 455/456.1 |
| 2013/0150090 A1 | 6/2013 | Cho et al. |
| 2015/0271641 A1* | 9/2015 | Sung ........................ G01S 5/02 |
| | | 455/456.6 |
| 2015/0356563 A1* | 12/2015 | Vohra ............... G06Q 20/40145 |
| | | 705/44 |
| 2016/0012413 A1* | 1/2016 | Chitilian ............ G06Q 20/3224 |
| | | 705/44 |
| 2016/0092864 A1* | 3/2016 | Evans .................... G06Q 20/14 |
| | | 705/40 |
| 2016/0139233 A1* | 5/2016 | Ganick ...................... G01S 1/70 |
| | | 398/127 |
| 2016/0353360 A1* | 12/2016 | Lee ........................ H04W 48/16 |
| 2018/0035365 A1* | 2/2018 | Koratekere Honnappa ................ |
| | | H04W 48/16 |
| 2018/0365677 A1* | 12/2018 | Baldie ................... H04W 48/12 |

FOREIGN PATENT DOCUMENTS

| | | |
|---|---|---|
| KR | 10-1591024 | 2/2016 |
| WO | 2014/065540 | 5/2014 |

\* cited by examiner

| Base association data set | Request flag |
|---|---|
| BADS1 | NO |
| BADS2 | Yes |
| ⋮ | ⋮ |
| BADSn | Yes |

METHOD AND APPARATUS FOR PROVIDING CROWDSOURCING SERVICES

CROSS REFERENCE TO RELATED APPLICATION

This application claims priority from and the benefit of Korean Patent Application No. 10-2016-0014784, filed on Feb. 5, 2016, which is hereby incorporated by reference for all purposes as if fully set forth herein.

BACKGROUND

Field

One or more exemplary embodiments relate to communication services, and, more particularly, to crowdsourcing services.

Discussion of the Background

Modern lifestyles are becoming increasingly reliant on mobile communication devices, such as cellular telephones, laptop computers, pagers, personal digital assistants, tablets, and the like. Advances in technology, services, and affordability have further given rise to a host of "additional" features beyond that of conventional mobile communication device features, such as voice and/or video communication, inputting and outputting information, storing data, taking pictures and/or video, playing music and/or multimedia files, surfing the internet, playing games, etc. For instance, mobile communication devices may provide various services to users based on communications with nearby electronic equipment via a wireless medium, such as location-based services, mobile payment services, etc.

The above information disclosed in this Background section is only for enhancement of understanding of the background of the inventive concept, and, therefore, it may contain information that does not form the prior art that is already known to a person of ordinary skill in the art.

SUMMARY

One or more exemplary embodiments provide devices and methods of crowdsourcing in connection with location information.

Additional aspects will be set forth in the detailed description which follows, and, in part, will be apparent from the disclosure, or may be learned by practice of the inventive concept.

According to one or more exemplary embodiments, a system-on-chip (SoC) includes: a first interface; and at least one application processor, configured to: receive location information from a communicator, the location information being associated with an electronic transaction; receive an identification of at least one access point from the communicator, the at least one access point being accessible to the communicator; generate an association data set including the location information and the identification of the access point; and transmit the association data set to the communicator, wherein the first interface is configured to provide communication between the at least one application processor and the communicator.

According to one or more exemplary embodiments, a method of providing crowdsourcing services includes: receiving, at a crowdsourcing server, an association data set including location information and a scan list from a mobile device; generating base location information based on the location information; and updating a database based on an association between the scan list and the base location information, wherein the location information is associated with an electronic transaction, and wherein the scan list represents an access point accessible to the mobile device.

According to one or more exemplary embodiments, a system-on-chip (SoC) includes: an interface; and at least one application processor configured to: receive location information from a communicator, the location information being associated with short-range wireless communication between the communicator and a reference terminal; receive an identification of at least one access point from the communicator, the at least one access point being accessible to the communicator; generate an association data set including the location information and the identification of the access point; and transmit the association data set to the communicator, wherein the interface is configured to provide communication between the at least one application processor and the communicator.

According to one or more exemplary embodiments, a method of providing crowdsourcing services includes: receiving, at a crowdsourcing server, a crowd association data set including location information and a scan list from a mobile device; generating base location information based on the location information; updating a database based on an association between the scan list and the base location information, wherein the location information is associated with short-range wireless communication between the mobile device and a reference terminal, and wherein the scan list represents an access point accessible to the mobile device.

According to one or more exemplary embodiments, a mobile device includes: a communicator; and at least one application processor coupled to the communicator, the at least one application processor being configured to: transmit payment data through the communicator to a reference terminal via short-rage wireless communication between the communicator and the reference terminal; receive location information associated with the transmission of the payment data through the communicator; and transmit the location information and a scan list representing an access point accessible to the communicator, to an external server.

According to one or more exemplary embodiments, a method includes: receiving, at a crowdsourcing server, identifications of access points from a plurality of mobile devices, the identifications of access points being associated with same location information; detecting an identification which is counted more than a predetermined number among the identifications of the access points; and updating a database based on an association between the detected identification and the location information, wherein the location information is associated with an electronic transaction, and each of the identifications of access points is accessible to a corresponding mobile device when the corresponding mobile device receives the location information.

According to one or more exemplary embodiments, a method includes: receiving, at a crowdsourcing server, location information associated with an electronic transaction, a scan list representing an access point accessible to a mobile device, and an identification of a transaction terminal corresponding to the electronic transaction, from the mobile device; enquiring, whether the identification of the transaction terminal corresponds to on-line or off-line, of an third-party server; and updating a database based on an association between the location information and the scan list.

According to one or more exemplary embodiments, a system-on-chip (SoC) includes: an interface of the SoC configured to communicate with a communicator; at least one application processor configured to: receive location information associated with an electronic transaction and an identification of a transaction terminal corresponding to the electronic transaction; output the identification of the transaction terminal to the communicator through the interface to enquire, whether the identification indicating the transaction terminal corresponds to on-line or off-line, of a third-party server; control the communicator to receive an identification of an access point accessible to the communicator when the identification of the transaction terminal corresponds to off-line; generate an association data set including the location information and the identification of the access point; and transmit the association data set to the communicator through the interface.

According to one or more exemplary embodiments, a client server includes: a communicator configured to communicate with a mobile device via a network; a database configured to store at least one program to be executed by the mobile device; and at least one application processor configured to provide the at least one program to the mobile device through the communicator, wherein the at least one program includes instructions including: controlling the mobile device to determine location information associated with an electronic transaction; controlling the mobile device to receive an identification of an access point accessible to the mobile device; controlling the mobile device to generate an association data set including the location information and the identification of the access point; and controlling the mobile device to transmit the association data set to a crowdsourcing server.

According to one or more exemplary embodiments, a client server includes: a communicator configured to communicate with a mobile device via a network; a database configured to store at least one program to be executed by the mobile device; and at least one application processor configured to provide the at least one program to the mobile device through the communicator, wherein the at least one program includes instructions including: controlling the mobile device to determine location information associated with short-range wireless communication between the mobile device and a reference terminal; controlling the mobile device to receive an identification of an access point accessible to the mobile device; controlling the mobile device to generate an association data set including the location information and the identification of the access point; and controlling the mobile device to transmit the association data set to a crowdsourcing server.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
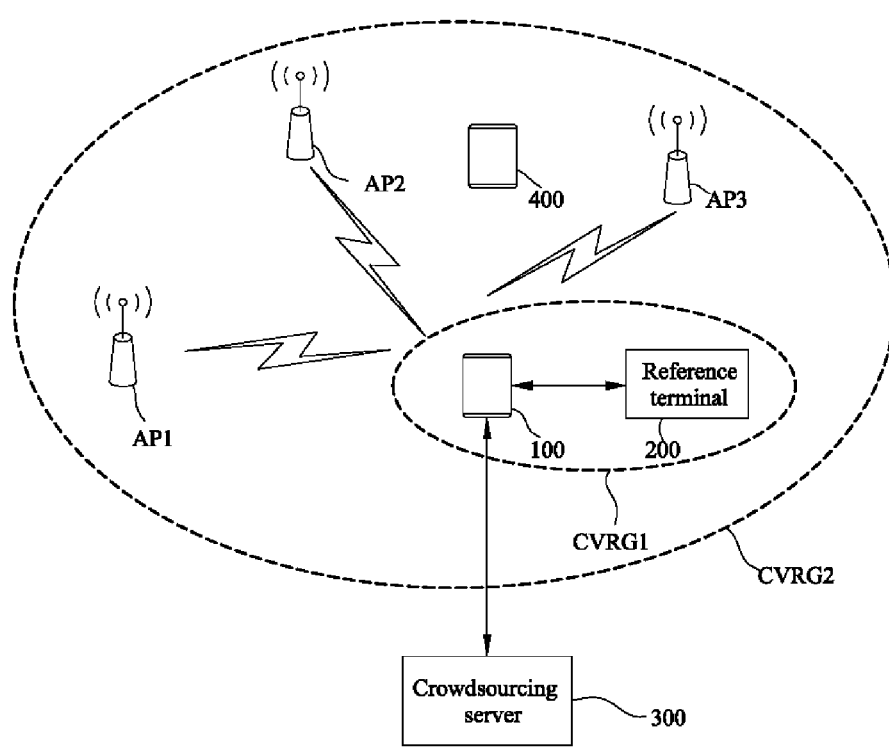
FIG. 1 is a diagram of a system configured to provide crowdsourcing services, according to one or more exemplary embodiments.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

Unless otherwise specified, the illustrated exemplary embodiments are to be understood as providing exemplary features of varying detail of various exemplary embodiments. Therefore, unless otherwise specified, the features, components, elements, modules, regions, and/or aspects of the various illustrations may be otherwise combined, separated, interchanged, and/or rearranged without departing from the disclosed exemplary embodiments. Further, in the accompanying figures, the size and relative sizes of components, elements, modules, regions, and/or aspects thereof may be exaggerated for clarity and descriptive purposes. Also, like reference numerals denote like elements.

When a component, element, module, region, etc. is referred to as being "on," "connected to," or "coupled to" another component, element, module, region, etc., it may be directly on, connected to, or coupled to the other component, element, module, region, etc. or intervening components, elements, modules, regions, etc. may be present. When, however, a component, element, module, region, etc. is referred to as being "directly on," "directly connected to," or "directly coupled to" another component, element, module, region, etc., there are no intervening components, elements, modules, regions, etc. present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms "first," "second," etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, regions, and/or groups thereof, but do not preclude the presence or addition of one or more other features, integers, steps, operations, elements, components, regions, and/or groups thereof.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

FIG. 1 is a diagram of a system configured to provide crowdsourcing services, according to one or more exemplary embodiments.

Referring to FIG. 1, mobile device 100 is configured to communicate with reference terminal 200, crowdsourcing server 300, and access points AP1, AP2, and AP3. It is noted that first coverage area CVRG1 illustrates an area (or region) in which wireless communication may be established between mobile device 100 and reference terminal 200. In this manner, wireless communication between a mobile device and reference terminal 200 may not occur (or may be otherwise prevented) outside of first coverage area CVRG1.

According to one or more exemplary embodiments, mobile device 100 may establish short-range wireless communication with reference terminal 200 via one or more wireless communication protocols. For instance, short-range wireless communication may occur via near field communication (NFC), Bluetooth communication, Wi-Fi communication, long-term evolution (LTE) device-to-device (D2D) communication, radio-frequency identification (RFID) communication, magnetic secure transmission (MST) communication, ZigBee communication, infrared data association (IrDA) communication, ultra-wideband (UWB) communication, pronounced ant plus (Ant+) communication, and/or the like.

Mobile device 100 may also establish wireless communication with one or more access points, such as access points AP1, AP2, and AP3. Access points AP1, AP2, and AP3 may be terminals accessible to mobile device 100. It is noted, however, that reference terminal 200 is not to be considered an access point. Mobile device 100 may communicate with each of access points AP1, AP2, and AP3 through at least one of various wireless communication protocols, such as one or more of the aforementioned short-range wireless communication protocols or a broader range wireless communication protocol, such as a cellular, radio, or satellite communication protocol. In this manner, second coverage area CVRG2 illustrates an area (or region) in which wireless communication may be established between mobile device 100 and at least one of access points AP1, AP2, and AP3.

According to one or more exemplary embodiments, mobile device 100 is configured to receive location information accompanying a short-range wireless communication with reference terminal 200. Mobile device 100 is also configured to detect accessible access points AP1, AP2, and AP3 and generate a scan list of accessible access points AP1, AP2, and AP3. The location information may include at least one of location information defined by latitude, longitude, and/or elevation, name information indicating a certain location, such as "XX office" and "XX store," and an address information indicating a certain location.

The establishment of short-range wireless communication may indicate that mobile device 100 is adjacent to the reference terminal 200. In this manner, the location information received (or otherwise determined) by mobile device 100 via short-range wireless communication may represent a location corresponding to reference terminal 200. The scan list generated by mobile device 100 when, for instance, short-range wireless communication is performed, may represent access points AP1, AP2, and AP3 that are accessible from a location corresponding to reference terminal 200.

Mobile device 100 may provide the location information and the scan list to crowdsourcing server 300 as, for instance, an association data set. It is noted, however, that the information may be provide in any other suitable manner or data arrangement. The crowdsourcing server 300 may receive (or otherwise obtain) the association data set(s) from a plurality of mobile devices, such as mobile device 100. Crowdsourcing server 300 may accumulate the obtained association data sets and store the association data sets in any suitable repository (e.g., memory, database, etc.) of or accessible to crowdsourcing server 300.

The crowdsourcing server 300 may provide one or more proximity services using the base association data sets. Second mobile device 400 located in second coverage area CVRG2 may scan, for example, nearby access points AP1, AP2, and AP3 over a determined unit period of time. For example, an application executed by second mobile device 400 may trigger a process to scan for nearby access points, such as access points AP1, AP2, and AP3. Second mobile device 400 may detect first through third access points AP1, AP2, and AP3 to generate a corresponding scan list, which may be transmitted to the crowdsourcing server 300 via, for instance, a proximity service request. It is also contemplated that the generated scan list may be requested by the crowdsourcing server 300, and, thereby, transmitted to the crowdsourcing server 300 in response to a request for a scan list. Crowdsourcing server 300 may search the database for a base scan list matching the scan list included in, for example, the proximity service request. To this end, the crowdsourcing server 300 may provide the matching base location information to the second mobile device 400. The provisioning of the matching base location information by the crowdsourcing server 300 may further at least one proximity service.

According to one or more exemplary embodiments, crowdsourcing server 300 may accumulate the base location information and the base scan list from mobile devices, such as mobile device 100, using a "big data" organizational method including, but not limited to, a crowdsourcing method. In this manner, a proximity service can be provided to mobile devices, e.g., mobile device 400, without a reference terminal (for example, a beacon device) configured to provide location information being disposed in the corresponding area (for example, first coverage area CVRG1 or second coverage area CVRG2) of mobile devices like mobile device 400. As such, the area where the proximity service is available may be effectively and efficiently expanded without the provisioning of additional networking equipment.

According to one or more exemplary embodiments, first mobile device 100 may generate the location information for the crowdsourcing when performing short-range wireless communication, even when a location service module, such as a global positioning system (GPS) module, is not available or mobile device 100 is located in an environment (e.g., indoors) obstructing the ability of mobile device 100 to detect a corresponding location using the location service module. As such, one or more exemplary embodiments enable the proximity service area to be effectively and efficiently extended without the provisioning of additional networking equipment.

Figure 2A:
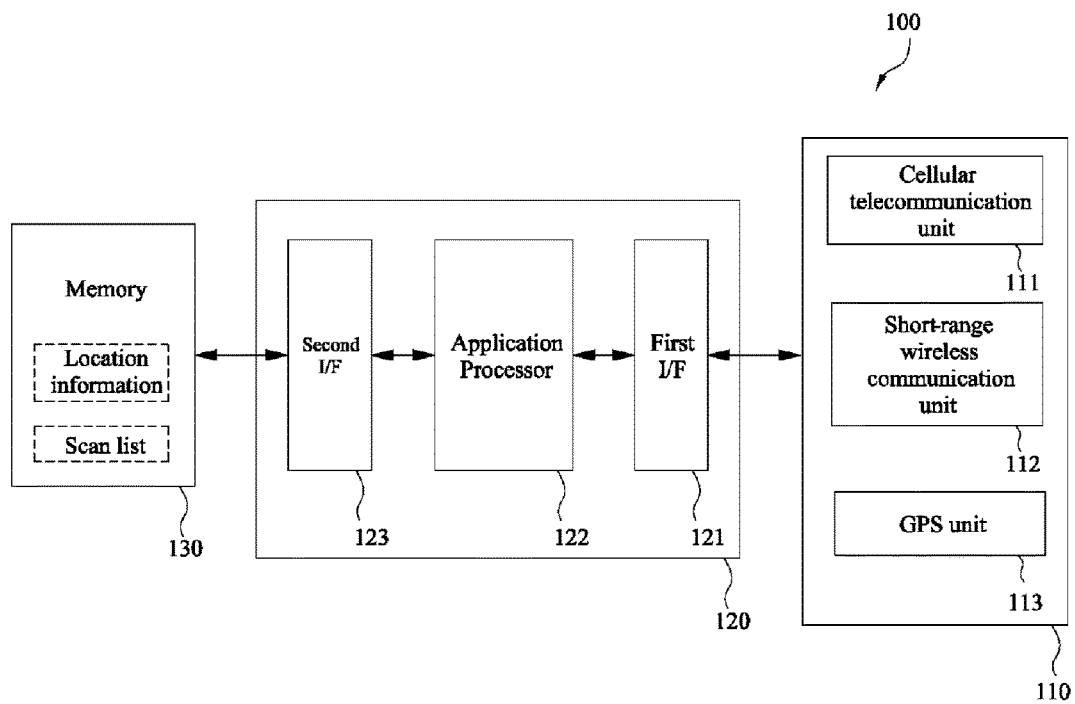
FIG. 2A is a block diagram of a mobile device, according to one or more exemplary embodiments.

FIG. 2A is a block diagram of a mobile device, according to one or more exemplary embodiments.

Referring to FIG. 2A, mobile device 100 includes communicator (or network interface) 110, System-on-Chip (SoC) 120, and memory 130. It is contemplated, however, that mobile device 100 may embody many forms and include multiple, additional, and/or alternative components and features.

Communicator 110 provides, for instance, a wireless interface for external communication. In this manner, communicator 110 may include a cellular telecommunication unit 111, a short-range wireless communication unit 112, and a location services (e.g., GPS) unit 113. For descriptive convenience, location services unit 113 will be, hereinafter, referred to as GPS unit 113.

Cellular telecommunication unit 111 is configured to transmit and receive wireless signals to/from other mobile devices (or terminals) and servers via one or more access points, which provide wireless coverage over land areas (or regions) designated as cells. The wireless signal may include various types of data including a voice call signal, a video call signal, a text message, a multimedia message, etc. Short-range wireless communication unit 112 is configured to perform short-range wireless communications. Short-range wireless communication unit 112 may perform wireless communication with a terminal in a short-range using at least one of the aforementioned short-range wireless communication protocols, e.g., NFC, Bluetooth, Wi-Fi, LTE D2D, RFID, MST, ZigBee, IrDA, UWB, Ant+, etc. The GPS unit 113 is configured to detect (or otherwise determine) a physical location of mobile device 100 via communication with GPS satellites. The physical location may be represented by one or more of the aforementioned location information, e.g., latitude, longitude, and/or elevation, the name of a location, an address of a location, etc.

SoC 120 is coupled to communicator 110 and memory 130, and, thereby, is configured to control the overall operation of mobile device 100. In this manner, SoC 120 is configured to facilitate communications with the reference terminal 200 of FIG. 1 via the short-range wireless communication unit 112. Further, SoC 120 is configured to receive a descriptor accompanying a short-range wireless communication. The descriptor may be data including the location information. In one or more exemplary embodiments, SoC 120 may execute a corresponding mobile application to perform short-range wireless communication with reference terminal 200, and, thereby, receive the descriptor in association therewith. It is also contemplated that SoC 120 may transfer payment data, which may be stored in memory 130 to reference terminal 200 to, for instance, request (or otherwise conduct) an electronic transaction. Transaction information corresponding to the electronic transaction may be received as a part of (or in association with) the descriptor.

SoC 120 includes first interface 121, application processor 122, and second interface 123. First interface 121 and second interface 123 operate in response to a control signal of application processor 122. First interface 121 may provide a communication interface between communicator 110 and application processor 122. Second interface 123 may provide a communication interface between communicator 110 and application processor 122. Application processor 122 is coupled to first and second interfaces 121 and 123. Application processor 122 is configured to control the overall operation of mobile device 100. Application processor 122 may communicate with communicator 110 and memory 130 through first and second interfaces 121 and 123, respectively.

According to one or more embodiments of the present invention, application processor 122 receives the descriptor including the location information. Application processor 122 may determine the location information from the descriptor, and store the location information to memory 130 through second interface 123. Application processor 122 may trigger scanning of nearby access points to cellular telecommunication unit 111 and short-range wireless communication unit 112. Application processor 122 may receive an identification of nearby access point and a signal strength from communicator 110 through first interface 121. Application processor 122 may generate a scan list based on the received identification and the signal strength. The generated scan list may be stored in memory 130. In one or more exemplary embodiments, the access point may be scanned within a predetermined unit period time after the short-range wireless communication. Further, application processor 122 may read the location information and the scan list from memory 130, and associate the location information and the scan list to generate an association data set. Application processor 122 may transfer association data set through first interface 121 to communicator 110. The association data set may be transmitted to crowdsourcing server 300 shown in FIG. 1 by communicator 110. The association data set may be transferred by any one of cellular telecommunication unit 111 and short-range wireless communication unit 112.

Memory 130 is coupled to SoC 120 through second interface 123. Memory 130 operates in response to a control signal from SoC 120. According to one or more exemplary embodiments, memory 130 may include at least one of various types such as Static RAM (SRAM), Dynamic RAM (DRAM), and Synchronous DRAM (SDRAM).

Figure 2B:
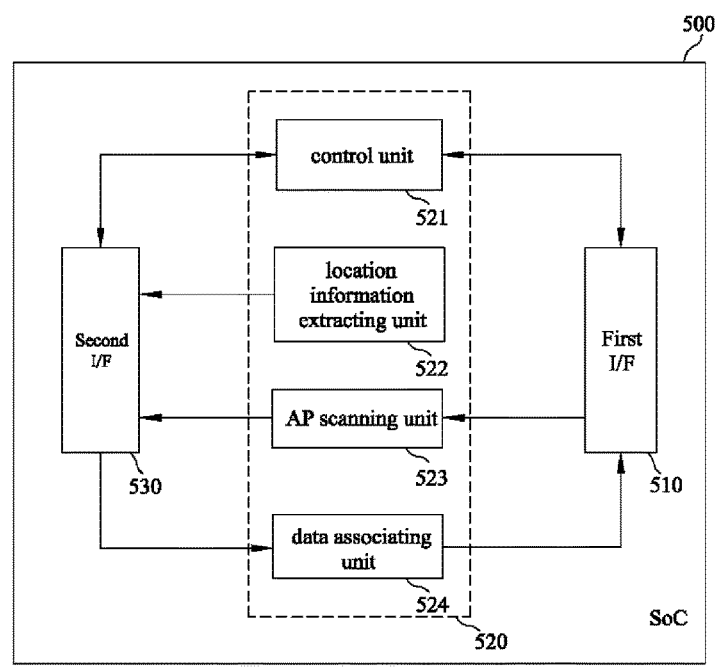
FIG. 2B is a block diagram of a System-on-Chip (SoC), according to one or more exemplary embodiments.

FIG. 2B is a block diagram of SoC, according to one or more exemplary embodiments.

Referring to FIG. 2B, SoC 500 includes first interface 510, application processor 520, and second interface 530. First and second interfaces 510 and 520 are configured and operated in a similar manner to first and second interfaces 121 and 123 shown in FIG. 2A.

Application processor 520 includes control unit 521, location information extracting unit 522, access point scanning unit 523, and data associating unit 524.

Control unit 521 is configured to control the location information extracting unit 522, access point scanning unit 523, and data associating unit 524. control unit 521 communicates with communicator 110 shown in FIG. 2A through first interface 510. Control unit 521 may execute various applications and receive the descriptor associated with the applications from communicator 110.

Location information extracting unit 522 extracts the location information from the descriptor and stores the location information into memory 130 through second interface 530. Location information extracting unit 522 receives the descriptor. The descriptor may be provided from control unit 521. The descriptor may be provided from memory 130 shown in FIG. 2A after the descriptor is stored in memory 130 by control unit 521.

Access point scanning unit 523 is configured to scan nearby access points through cellular telecommunication unit 111 and short-range wireless communication unit 112 shown in FIG. 2A. Access point scanning unit 523 may receive an identification of accessible access point and a corresponding signal strength of the access point. Access point scanning unit 523 is configured to generate a scan list the received identification of the access point and the signal strength. The scan list may be a list representing identifications of the access points and the corresponding signal strength. Access point scanning unit 523 stores the generated scan list into memory 130 through second interface 530.

Data associating unit 524 is configured to read the location information and the scan list from memory 130 through second interface 530, and generate an association data set including the location information and the scan list. Data associating unit 524 transfers the generated association data set to communicator 110 through first interface 510. The association data set may be transmitted to crowdsourcing server 300 shown in FIG. 1 by communicator 110. Transmitting of the association data set may be performed by one of cellular telecommunication unit 111 and short-range wireless communication unit 112.

Figure 2C:
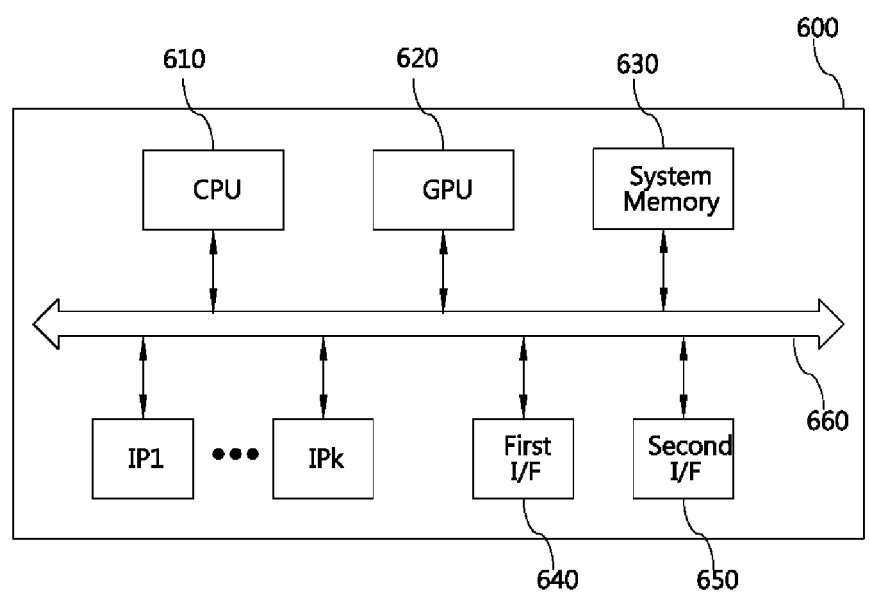
FIG. 2C is a block diagram of a SoC, according to one or more exemplary embodiments.

FIG. 2C is a block diagram illustrating of SoC 120, according to one or more exemplary embodiments.

Referring to FIG. 2C, SoC 600 includes at least one central processing unit (CPU) 610, graphic processing unit (GPU) 620, system memory 630, first and second interfaces 640 and 650, bus 660, and first to kth intellectual property (IP) blocks IP1 to IPk.

CPU 610 may include a microprocessor including hardware, software, and/or firmware, which processes various tasks and operates an operating system (OS). CPU 610 may include a plurality of processing cores and a cache memory. CPU 610 may control GPU 620, system memory 630, first and second interfaces 640 and 650, bus 660, and first to kth IP blocks IP1 to IPk.

GPU 620 may be coupled to bus 660 and may be configured to handle one or more processes (e.g., a series and/or simultaneous processes) in response to a control signal of CPU 610. For example, GPU 620 performs a video data processing. GPU 620 may be configured to handle one or more threads associated with video data processing, which may be performed via single threading or multi-threading configuration. GPU 620 may include a control unit configured to calculate (or otherwise determine) and compare graphic-related data. GPU 620 may also be configured to analyze and execute a command(s) on behalf of CPU 610.

System memory 630 may be used as a working memory of CPU 610. System memory 630 may include at least one of Static RAM (SRAM), Dynamic RAM (DRAM), and Synchronous DRAM (SDRAM).

First and second interfaces 640 and 650 may be configured to and operated in a similar manner to first and second interfaces 121 and 123.

IP blocks IP1 to IPk may be components configured to perform various functions and operations in SoC 600. Each of IP blocks IP1 to IPk may be classified into a master IP block or a slave IP block. It is also contemplated that the master IP block may serve as the slave IP block, or vice versa.

In one or more exemplary embodiments, at least one of CPU 610, GPU 620, and IP blocks IP1 to IPk may function as control unit 521, location information extracting unit 522, access point scanning unit 523, and data associating unit 524 shown in FIG. 2B. For example, CPU 610 may load one or more programs including instructions for control unit 521, location information extracting unit 522, access point scanning unit 523, and data associating unit 524, and execute the loaded programs.

In one or more exemplary embodiments, control unit 521, location information extracting unit 522, access point scanning unit 523, and data associating unit 524 may be provided as one or more hardware modules. In one or more exemplary embodiments, at least one of control unit 521, location information extracting unit 522, access point scanning unit 523, and data associating unit 524 may be provided as the hardware module, and the others may be functioned by at least one of CPU 610, GPU 620, and IP blocks IP1 to IPk In exemplary embodiments, SoC 600 may be implemented via one or more general purpose and/or special purpose components, such as one or more discrete circuits, digital signal processing chips, integrated circuits, application specific integrated circuits, microprocessors, processors, programmable arrays, field programmable arrays, instruction set processors, and/or the like.

Figure 3:
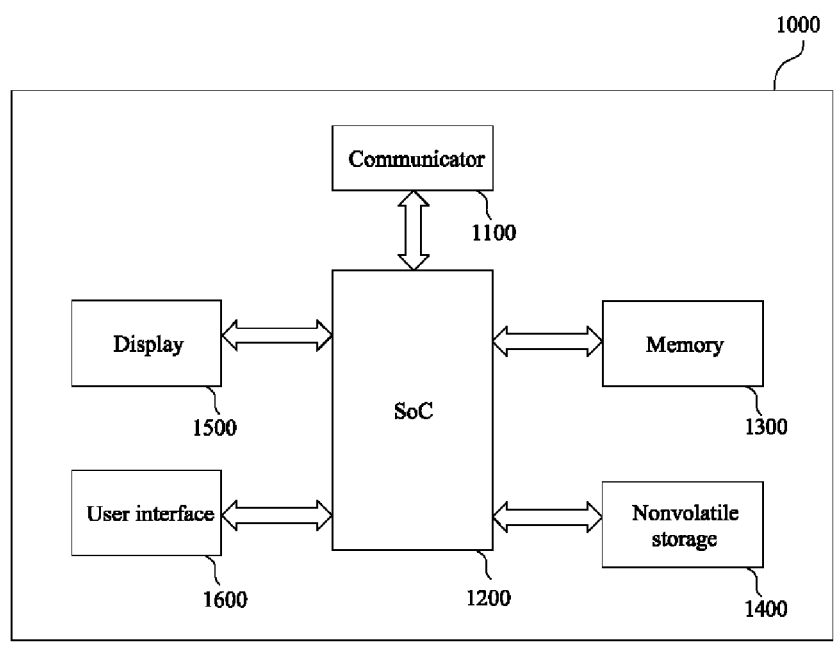
FIG. 3 is a block diagram of a mobile device, according to one or more exemplary embodiments.

FIG. 3 is a block diagram of mobile device 100, according to one or more exemplary embodiments.

Referring to FIG. 3, mobile device 1000 includes communicator 1100, SoC 1200, memory 1300, nonvolatile storage 1400, display 1500, and user interface 1600.

Communicator 1100, SoC 1200, and memory 1300 may be configured to and operated in a similar manner to communicator 110, SoC 120, and memory 130, respectively. In FIG. 3, it is described that communicator 1100 and memory 1300 is provided out of SoC 1200. However, embodiments are not limited thereto, and at least one of communicator 1100 and memory 1300 may be provided as a component of SoC 1200.

Nonvolatile storage 1400 includes various types of storages which retain stored data regardless power on/off conditions. For example, nonvolatile storage 1400 includes at least one of various types such as a flash memory, a hard disk, a Read Only Memory (ROM), a Programmable ROM (PROM), an Electrically Programmable ROM (EPROM), an Electrically Erasable and Programmable ROM (EEPROM), a Phase-change RAM (PRAM), a Magnetic RAM (MRAM), a Resistive RAM (RRAM), a Ferroelectric RAM (FRAM).

Display 1500 displays information which is processed in mobile device 1000, according to a control of SoC 1200. At least one of IP blocks IP1 to IPk shown in FIG. 2C may be provided as a component interfacing for display 1500.

User interface 1600 detects an user input for controlling an operation of mobile device 1000, and generates corresponding input data. User interface 1600 may include a input device detecting a command or information from the user, such as a key pad, a mouse, a finger scan sensor, a dome switch, a touchpad, and a jog wheel. At least one of IP blocks IP1 to IPk may be provided as a component interfacing for user interface 1600. In one or more exemplary embodiments, SoC 1200 may perform the short-range wireless communication through communicator 1100 in response to the user input through user interface 1600.

Figure 4:
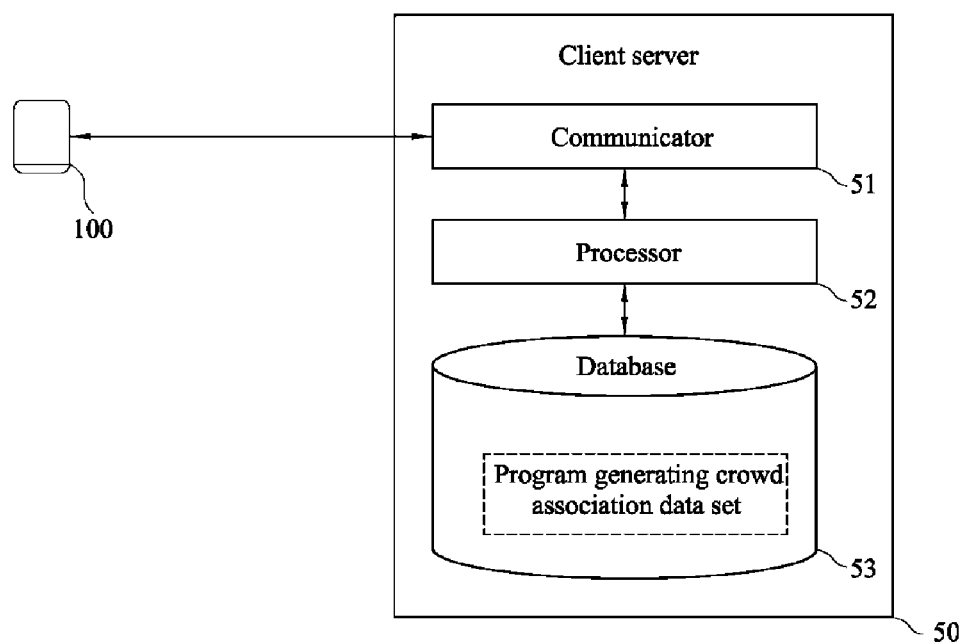
FIG. 4 is a block diagram of a client server configured to communicate with a mobile device, according to one or more exemplary embodiments.

FIG. 4 is a block diagram of client server 50 configured to communicate with mobile device 100, according to one or more exemplary embodiments.

According to one or more exemplary embodiments, the program to be executed by mobile device 100 may be provided by client server 50. Referring to FIG. 4, client server 50 includes communicator 51, processor 52, and database 53. Communicator 51 communicates with mobile device 100 via the network. Processor 52 provides the program stored in database 53 through communicator 51 via the network to mobile device 100.

The program stored in database 53 may include instructions to be executed by application processor 122 (See FIG. 2A) in mobile device 100. The program stored in database 53 may include instructions for controlling mobile device 100 to a) extract the location information from the received descriptor, b) detect nearby access points and generate a scan list, c) generate the association data set according to the location information and the scan list, and d) transfer the association data set to crowdsourcing server 300 (See FIG. 1).

Figure 5:
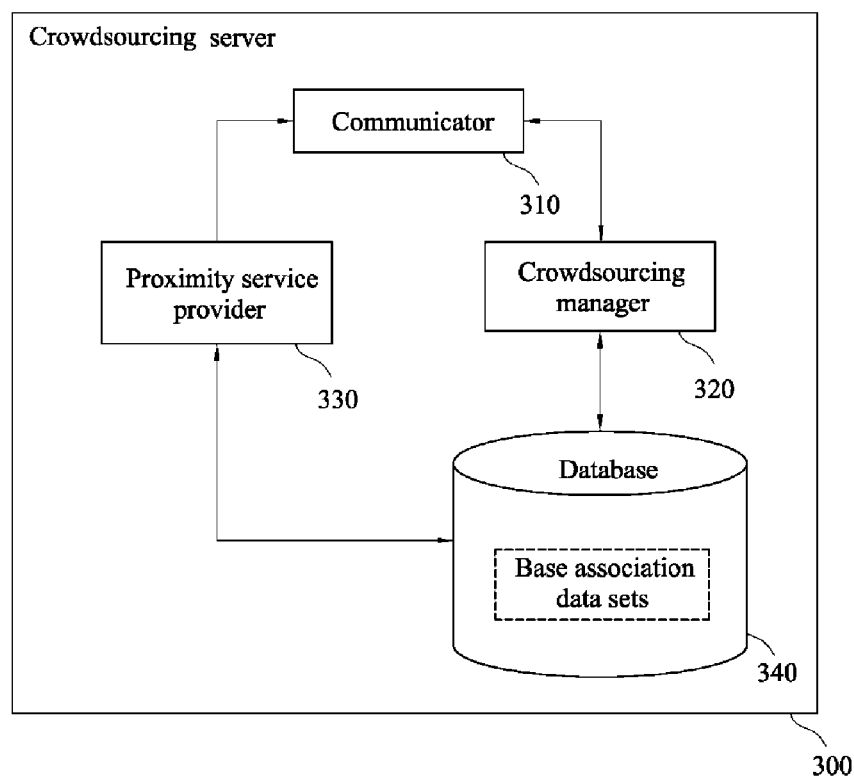
FIGS. 5 and 6 are block diagrams of a crowdsourcing server, according to one or more exemplary embodiments.

FIG. 5 is a block diagram of crowdsourcing server 300 according to one or more exemplary embodiments.

Referring to FIG. 5, crowdsourcing server 300 includes communicator 310, crowdsourcing manager 320, proximity service provider 330, and database 340.

Communicator 310 communicates with mobile devices 100 and 400 (See FIG. 1) via the network. Communicator 310 receives association data set, and delivers received association data set to crowdsourcing manager 320. Communicator 310 receives the proximity service request from second mobile device 400, and provides received proximity service request to proximity service provider 330.

The crowdsourcing manager 320 is configured to update the association data set to database 340 as an base association data set.

In one or more exemplary embodiments, the location information received from first mobile device 100 may include various types of location information according to the descriptor. For example, the location information may include location information representing a name of a certain location such as "XX office" and "XX store," address indicating a certain area, or the latitude and the longitude of a certain location. Database 340 stores base association data sets. Each of the base association data sets corresponds base location information. The base location information may fix a predetermined type of location information. For example, the base location information may include a name indicating a certain location.

Crowdsourcing manager 320 may convert the location information received from first mobile device 100 to the predetermined type of location information. For example, crowdsourcing manager 320 may convert the location information representing address indicating a certain area to a predetermined type of location information representing the name indicating a certain location. Database for converting the location information to the base location information may be further provided.

Crowdsourcing manager 320 may detect the base location information corresponding to the converted location information in the base association data sets, and associate the scan list with the detected base location information. Consequently, the base association data sets may be accumulated in database 340.

Proximity service provider 330 extracts a scan list from the proximity service request when the proximity service request is received from second mobile device 400. Proximity service provider 330 selects a base scan list from database 340 matching the extracted scan list, and determines a base location information corresponding to the extracted scan list from database 340. The proximity service provider 330 may transfer the extracted base location information to the second mobile device 400 through the communicator 310.

In one or more exemplary embodiments, crowdsourcing server 300 including communicator 310, crowdsourcing manager 320, proximity service provider 330, and/or one or more components thereof, may be implemented via one or more general purpose and/or special purpose components, such as one or more discrete circuits, digital signal processing chips, integrated circuits, application specific integrated circuits, microprocessors, processors, programmable arrays, field programmable arrays, instruction set processors, and/or the like.

According to exemplary embodiments, the features, functions, processes, etc., described herein may be implemented via software, hardware (e.g., general processor, digital signal processing (DSP) chip, an application specific integrated circuit (ASIC), field programmable gate arrays (FPGAs), etc.), firmware, or a combination thereof. In this manner, communicator 310, crowdsourcing manager 320, proximity service provider 330, and/or one or more components thereof may include or otherwise be associated with one or more memories (not shown) including code (e.g., instructions) configured to cause communicator 310, crowdsourcing manager 320, proximity service provider 330, and/or one or more components thereof to perform one or more of the features, functions, processes, etc., described herein.

According to one or more exemplary embodiments, crowdsourcing server 300 may function as client server 50 shown in FIG. 4. That is, crowdsourcing server 300 may include database 53 shown in FIG. 4, and provide the corresponding program in response to mobile device 100.

Figure 6:
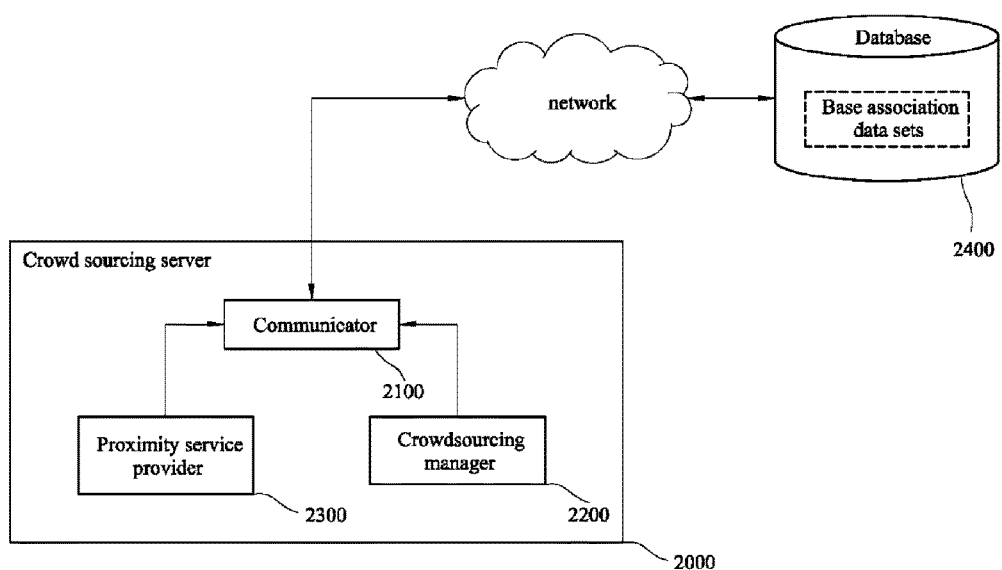

FIG. 6 is a block diagram of crowdsourcing server 300, according to one or more exemplary embodiment.

Referring to FIG. 6, crowdsourcing server 300 includes communicator 2100, crowdsourcing manager 2200, and proximity service provider 2300. Communicator 2100, crowdsourcing manager 2200, and proximity service provider 2300 may be configured and operated in a similar manner to communicator 310, crowdsourcing manager 320, and proximity service provider 330 described with reference to FIG. 5, respectively. Hereinafter, overlapping descriptions will be omitted.

Database 2400 may be disposed outside crowdsourcing server 2000 and communicate with crowdsourcing server 2000 via the network. Crowdsourcing manager 2200 and proximity service provider 2300 may communicate with database 2400 through communicator 2100.

Figure 7:
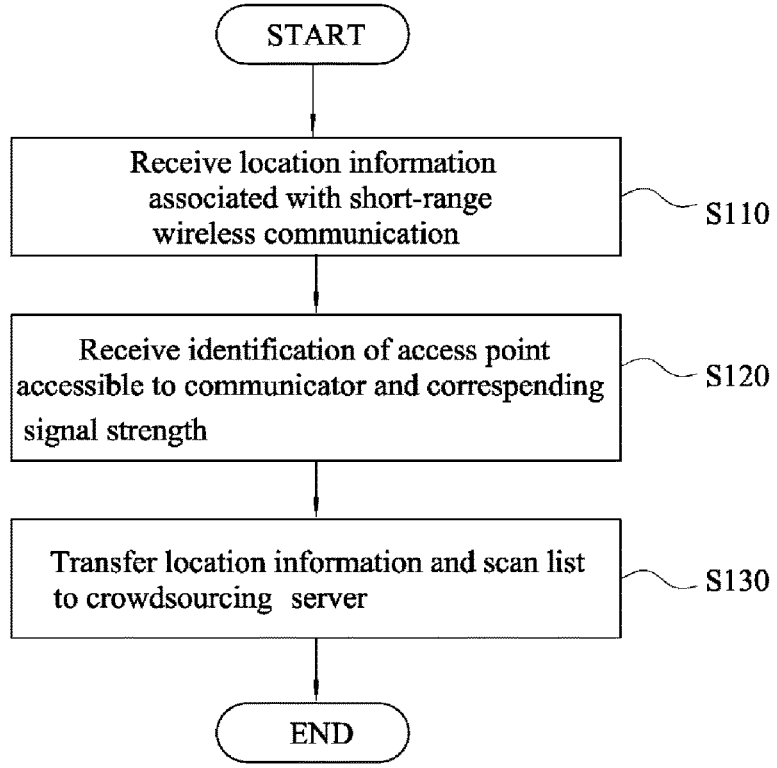
FIGS. 7 and 8 are flowchart of a process to provide crowdsourcing information, according to one or more exemplary embodiments.
Figure 8:
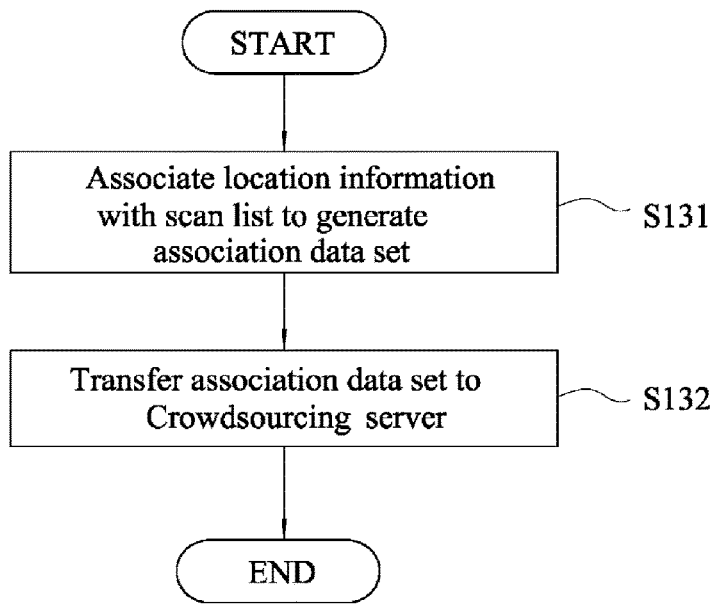

FIGS. 7 and 8 are flowcharts of process to provide crowdsourcing information to a crowdsourcing sever, according to one or more exemplary embodiments.

Referring to FIG. 1 and FIG. 7, mobile device 100 receives the location information associated with the short-range wireless communication with reference terminal 200. (S110) The location information may be received as a part of the descriptor. In one or more exemplary embodiments, the descriptor may be provided from reference terminal 200. In one or more exemplary embodiments, the descriptor may be provided from a partner server which is connected to the reference terminal via the wired network or the wireless network.

Mobile device 100 receives an identification of an access point accessible to communicator 110 shown in FIG. 2A and a corresponding signal strength. Mobile device 100 may detect nearby access points to receive identifications of access points and corresponding signal strengths, and generate the scan list. (S120) Since mobile device 100 may be relocated to another location, detecting of the at least one accessible scan point is performed shortly after the short-range wireless communication. Mobile device 100 may trigger detecting of the at least one accessible scan point within a determined period of time after short-range wireless communication with reference terminal 200.

Mobile device 100 transfers the location information and the scan list to crowdsourcing server 300. (S130) The scan list includes identifications of the access points and the corresponding signal strengths. In one or more exemplary embodiments, mobile device 100 may transfer the location information and the scan list as a data packet.

Figure 9:
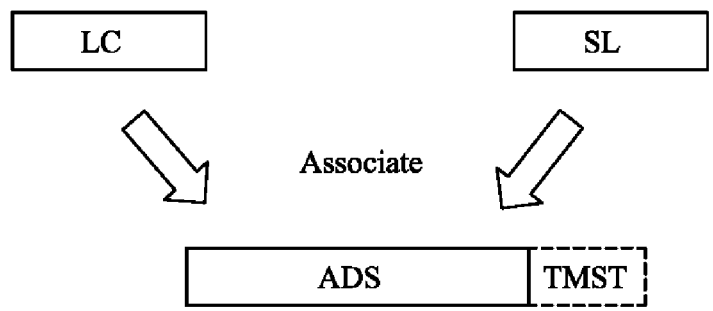
FIG. 9 is a block diagram of location information, a scan list, and a association data set, according to one or more exemplary embodiments.

FIG. 8 is a flowchart of step S130 shown in FIG. 7, according to one or more exemplary embodiments. FIG. 9 is a block diagram of location information LC, scan list SL, and association data set ADS, according to one or more exemplary embodiments.

Referring to FIG. 8, mobile device 100 generates association data set by associating the location information and the scan list. (S131) That is, the association data set may include the location information, the scan list, and a mapping information between the location information and the scan list. Referring to FIG. 9, association data set ADS includes location information LC and scan list SL. In one or more exemplary embodiments, the association data set ADS is provided as a data packet.

In one or more exemplary embodiments, a time stamp can be added to association data set ADS. Time stamp TMST represents a time corresponding association data set ADS. The time stamp and association data set ADS may be provided to crowdsourcing server 300 (See FIG. 1). Crowdsourcing server 300 may determine the time at which location information LC and scan list SL is obtained according to time stamp TMST. Therefore, crowdsourcing server 300 may effectively update association data sets ADS to database 340 (see FIG. 5) according to the time order of the association data sets. Mobile device 100 may transfer association data set ADS with time lag. Mobile device 100 may temporary store association data set ADS to an internal storage (for example, memory 130 in FIG. 1), and transfer association data set ADS at an appropriate time. Therefore, mobile device 100 may operate more flexibly.

According to one or more exemplary embodiments, time stamp TMST may represent a time when the short-range wireless communication is performed. In one or more exemplary embodiments, time stamp TMST may represent a time at which the nearby access points is scanned. In one or more exemplary embodiments, when the location information is obtained from a transaction information corresponding to an electronic transaction, time stamp TMST may represent a time corresponding the electronic transaction. For example, time stamp TMST may represent a time when the transaction information is received, and/or a time when the electronic transaction is required.

Referring back to FIG. 8, mobile device 100 transfers association data set ADS to crowdsourcing server 300. (S132)

Figure 10:
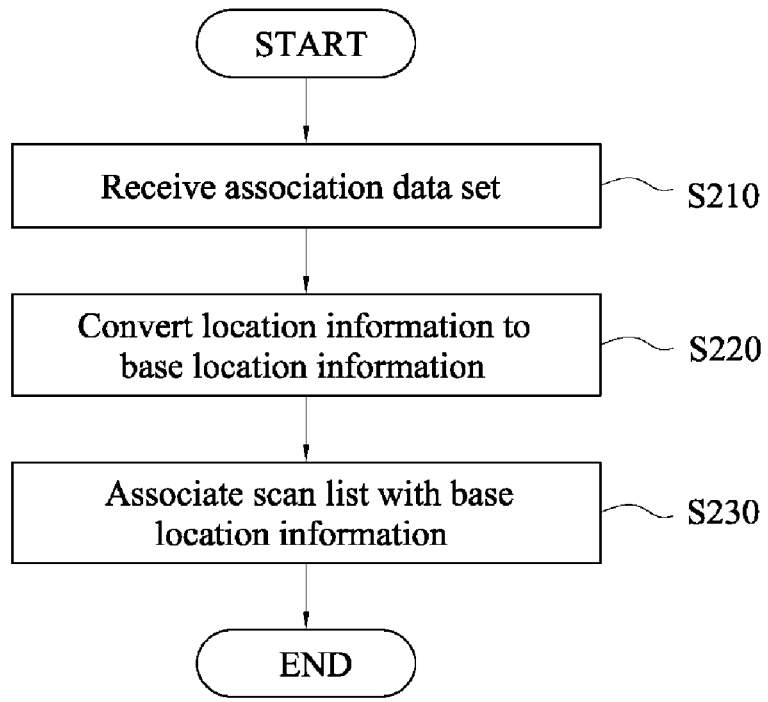
FIG. 10 is a flowchart of a process to provide a crowdsourcing service, according to one or more exemplary embodiments.

FIG. 10 is a flowchart of a process to provide a crowdsourcing service via crowdsourcing server 300, according to one or more exemplary embodiments.

Referring to FIG. 10, association data set ADS (See FIG. 9) is received. (S210) Location information LC (See FIG. 9) is converted to the base location information having a predetermined type of information. (S220) scan list SL (See FIG. 9) is associated with the base location information and updated into database 340 (S230, See FIG. 5).

Figure 11:
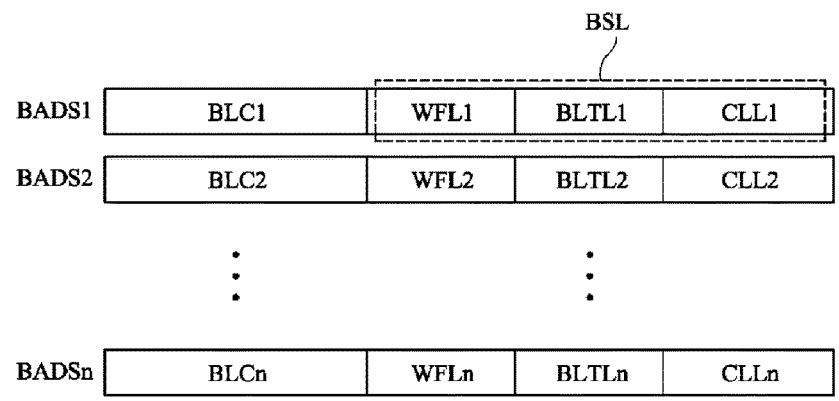
FIG. 11 is a block diagram of base association data sets, according to one or more exemplary embodiments.

FIG. 11 is a block diagram of base association data sets BADS1 to BADSn, according to one or more exemplary embodiments.

Referring to FIG. 11, each of first to nth base association data sets BADS1 to BADSn includes base location information BLC and base scan list BSL corresponding to base location information BLC, where n is a positive integer. First to nth base association data sets BADS1 to BADSn may include first to nth base location information BLC1 to BLCn, respectively. Base scan list BSL corresponding to each base location information BLC may include a plurality of types of communication that corresponds respective base location information BLC. For example, each base scan list BLC may include Wi-Fi scan list WFL, Bluetooth scan list BLTL, and cellular scan list CLL, as shown in FIG. 11.

Referring to FIG. 11, first base association data set BADS1 includes first Wi-Fi scan list WFL1, first Bluetooth scan list BLTL1, and first cellular scan list CLL1, which are mapped to first location information BLC1. Second base association data set BADS2 includes second Wi-Fi scan list WFL2, second Bluetooth scan list BLTL2, and second cellular scan list CLL2 which are mapped to second location information BLC2. Accordingly, nth base association data set BADSn includes nth Wi-Fi scan list WFLn, nth Bluetooth scan list BLTLn, and nth cellular scan list CLLn which are mapped to nth location information BLCn.

Figure 12:
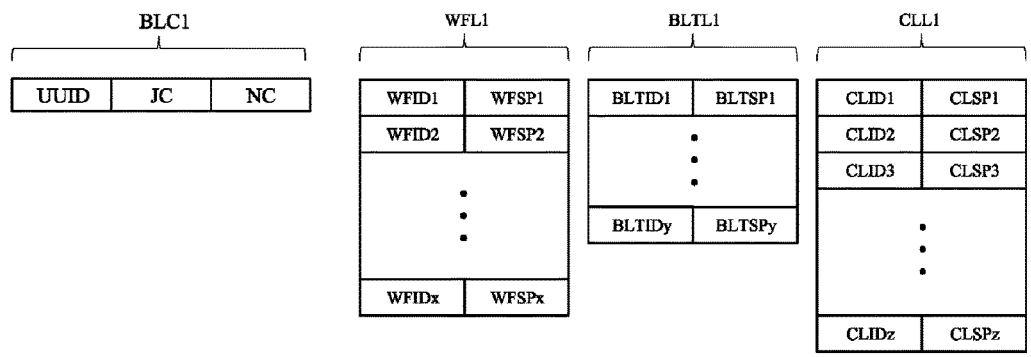
FIG. 12 is a block diagram of a base association data set, according to one or more exemplary embodiments.

FIG. 12 is a block diagram of base association data set, according to one or more exemplary embodiments.

Referring to FIG. 12, first base location information BLC1 may include various fields for indicating a certain location. In one or more exemplary embodiments, first base location information BLC1 may include fields such as unique identifier UUID, major code JC, and minor code NC. For example, the unique identifier UUID may be a field specifying a name of a merchant such as 'pariscroissant,' the major code JC may be a field specifying a location such as "Dogok branch,' and the minor code NC may be a field specifying a more specific location when necessary.

The scan list of a single type may include an ID indicating an access point and a signal strength of the corresponding access point. In FIG. 12, first Wi-Fi scan list WFL1 includes first to xth Wi-Fi IDs WFID1 to WFIDx and first to xth signal strengths WFSP1 to WFSPx corresponding to respective first to xth Wi-Fi IDs WFID1 to WFIDx, where x is a positive integer. Bluetooth scan list BLTL1 includes first to yth Bluetooth IDs BLTID1 to BLTIDy and first to yth signal strengths BLTSP1 to BLTSPy corresponding to respective first to yth Bluetooth IDs BLTID1 to BLTIDy, where y is a positive integer. First cellular scan list CLL1 includes first to zth cellular IDs CLID1 to CLIDz and first to zth signal strengths CLSP1 to CLSPz corresponding to respective first to zth cellular IDs CLID1 to CLIDz.

Figure 13:
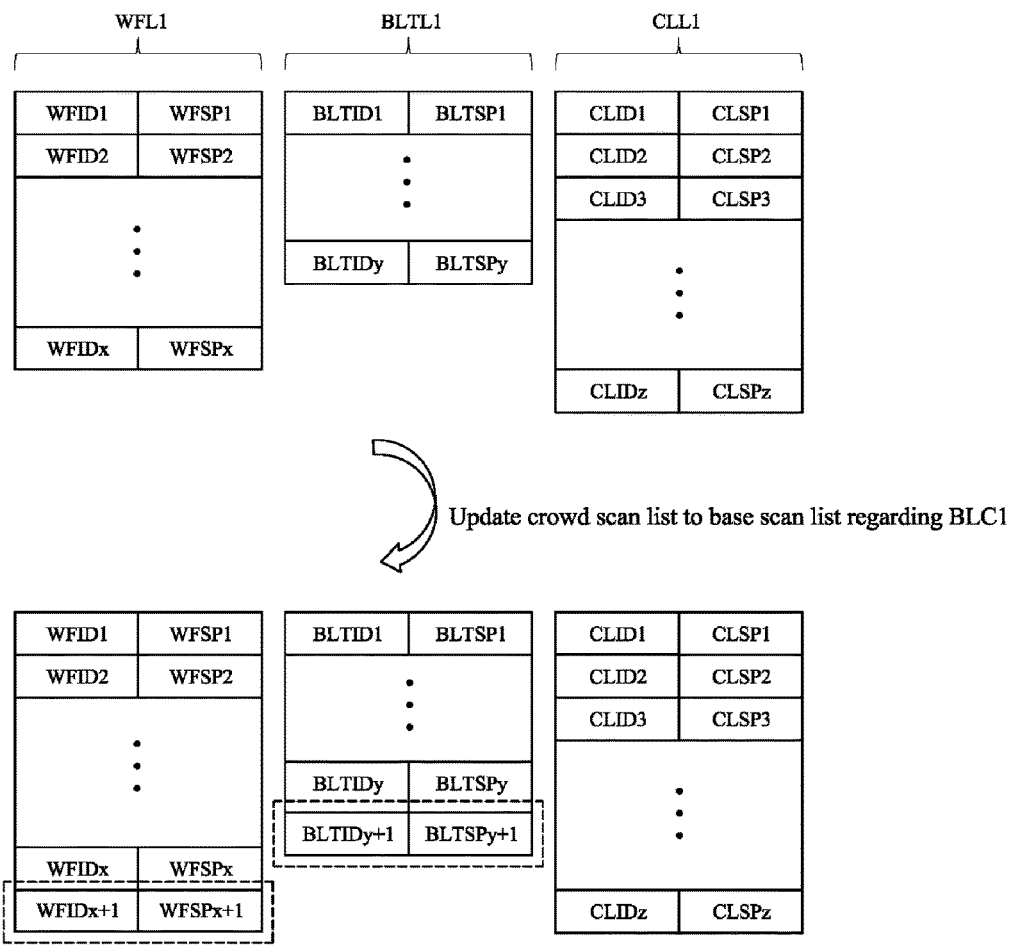
FIG. 13 illustrates a process to update a scan list in connection with first base location information, according to one or more exemplary embodiments.

FIG. 13 illustrates a process to update the scan list in connection with first base location information BLC1, according to one or more exemplary embodiments.

First mobile device 100 (See FIG. 1) may provide association data set ADS corresponding to first base location information BLC1. Crowdsourcing server 300 (See FIG. 1) may search first base location information BLC1 among base location information BLC1 to BLCn (See FIG. 11) in base association data sets BADS1 to BADSn. Crowdsourcing server 300 may map scan list SL included in the provided association data set ADS to first base location information BLC1 and update scan list SL to database 340.

association data set ADS includes a Wi-Fi ID and a Bluetooth ID. Accordingly, x+1th Wi-Fi ID WFIDx+1 and signal strength WFSPx+1 thereof, and y+1 Bluetooth ID BLTIDy+1 and signal strength BLTSPy+1 thereof may be updated in connection with first base location information BLC1, as shown in FIG. 13.

Figure 14:
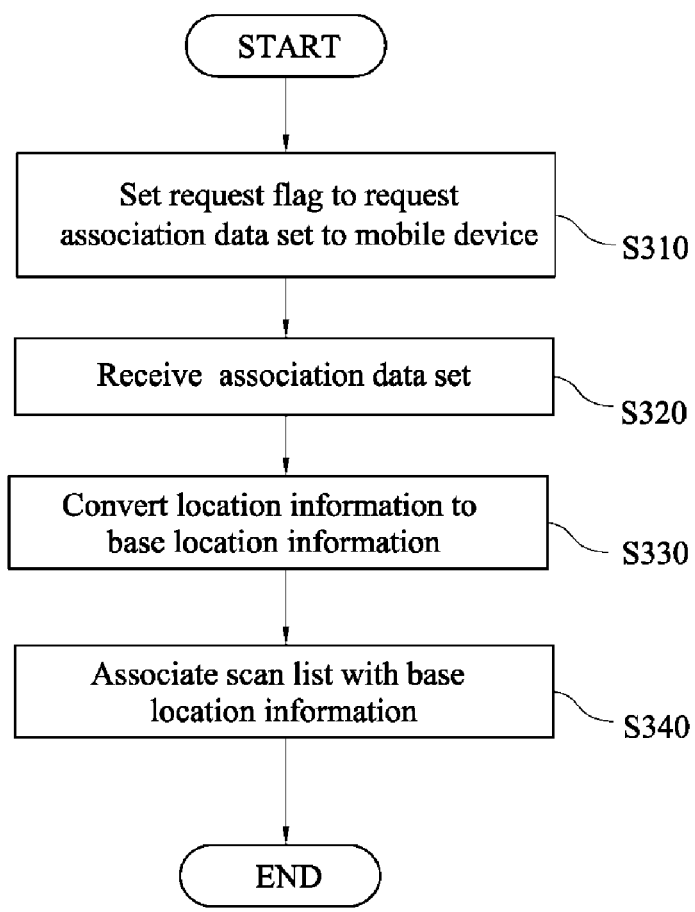
FIG. 14 is a flowchart of a process to associate a scan list with base location information, according to one or more exemplary embodiments.
Figures 15, 16:
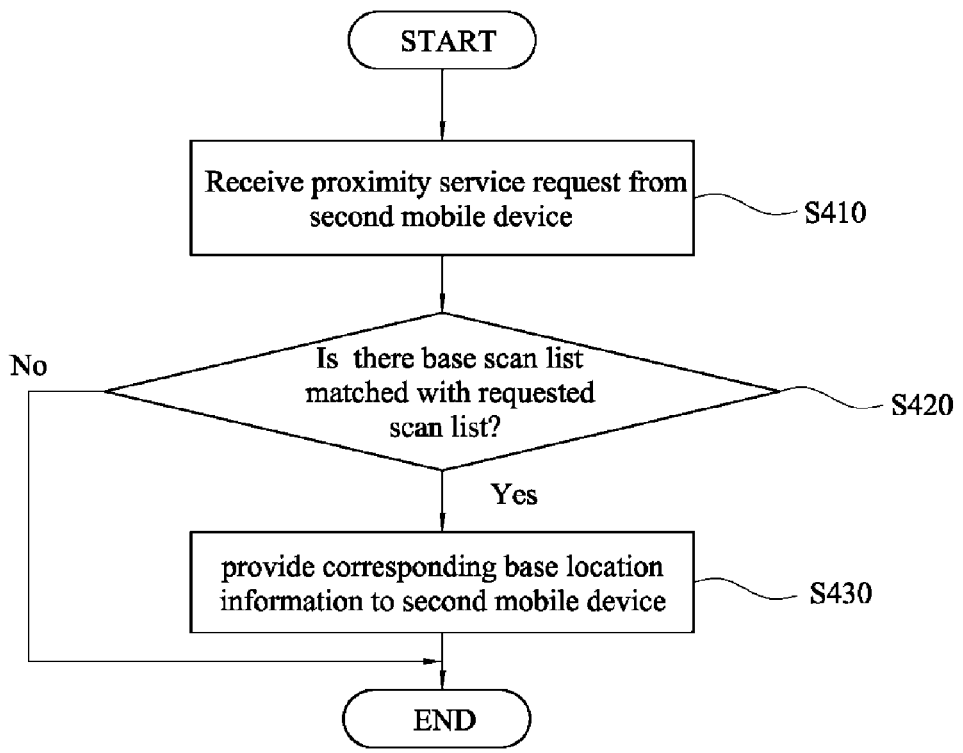
FIG. 15 is a block diagram of base association data sets and request flags, according to one or more exemplary embodiments.
FIG. 16 is a flowchart of a process to provide a proximity service, according to one or more exemplary embodiments.

FIG. 14 is a flowchart of a process to associate a scan list with base location information, according to one or more exemplary embodiments. FIG. 15 is a block diagram of base association data sets and request flags, according to one or more exemplary embodiments.

Referring back to FIG. 14, descriptions for steps S320 to S340 are similar to the descriptions for steps S210 to S230 with reference to FIG. 10, respectively. Hereinafter, overlapping description will be omitted.

Referring to FIG. 14, the request flag is set to request the association data set from mobile device 100 (S310, see FIG. 1). Referring to FIG. 15, each of the request flags may be respectively associated to corresponding first to nth base association data sets BADS1 to BADSn. The request flags may be stored in database 340 (See FIG. 5) with first to nth base association data set BADS1 to BADSn.

Crowdsourcing server 300 (See FIG. 1) may request association data set ADS (See FIG. 9) to mobile device 100 by transferring the request flag to mobile device 100. According to a value of the transferred request flag, mobile device 100 may selectively provide association data set ADS.

In one or more exemplary embodiments, mobile device 100, when the location information LC (See FIG. 9) is extracted from the descriptor, may request crowdsourcing server 300 to the request flag corresponding to the extracted location information LC. Crowdsourcing server 300 may convert location information LC to base location information BLC (See FIG. 11) and provide the request flag corresponding to base location information BLC to mobile device 100. Referring to FIG. 15, the request flag corresponding to first base association data set BADS1 is "NO" and the request flags corresponding to second to nth base association data sets BADS2 to BADSn are "YES". Accordingly, mobile device 100 may not provide association data set ADS when mobile device 100 receives the request flag corresponding to first base association data set BADS1, and may provide association data set ADS when mobile device 100 receives the request flag corresponding to one of second to nth base association data set BADS2 to BADSn.

By managing the request flags as described above, the base scan list corresponding to each base location information may be selectively crowd sourced.

FIG. 16 is a flowchart of a process to provide proximity services via crowdsourcing server 300, according to one or more exemplary embodiments.

Referring to FIG. 16, crowdsourcing server 300 receives a proximity service request from second mobile device 400. (S410) Second mobile device 400 may detect nearby access points AP1 to AP3 to generate a scan list, and request the proximity service by transferring the generated scan list to crowdsourcing server 300.

At step S420, crowdsourcing server 300 may determine whether the base scan list which is matched with the requested scan list is in database 340. (S420)

In one or more exemplary embodiments, a fingerprint of each base scan list may be compared with the fingerprint of the requested scan list to determine whether each base scan list matches with the requested scan list. For example, a determined base scan list may be preliminarily generated by including base scan lists if a number of associated IDs matching the IDs of access points in the requested scan list is greater than a determined number, and corresponding base scan list may be elected by choosing the base scan list that matches closely with the signal strength of each ID corresponding to the requested scan list from the determined base scan list by calculating the difference in the signal strength of each ID associated with the requested scan list and the base scan list.

For example, the difference between the signal strength of each ID associated with the requested scan list and the base scan list may be calculated according to an equation 1.

$$D = \sum_{k=1}^{r} |SP_k^{base} - SP_k^{request}|^2 \quad \text{[Equation 1]}$$

Referring to the equation 1, $SP_k^{base}$ represents the signal strength corresponding to a kth ID which matches with the requested scan list from the determined base scan list. $SP_k^{request}$ represents the signal strength corresponding to an kth ID which matches with the corresponding base scan list from the requested scan list, where r is a positive integer and k is a positive integer smaller than r. The kth ID of the base scan list and the kth ID of the requested scan list may represent identical type of access point, such as the Wi-Fi communication. In this case, r may represent the number of IDs of base scan list that match the IDs of the requested scan list. Crowdsourcing server may determine that the base scan list is the corresponding base scan list matching with the requested scan list if the value of D is smaller than a predetermined value.

If the base scan list which matches with the requested scan list is in database 340, crowdsourcing server 300 may provide the corresponding base scan list to second mobile device 400. (S430)

Figure 17:
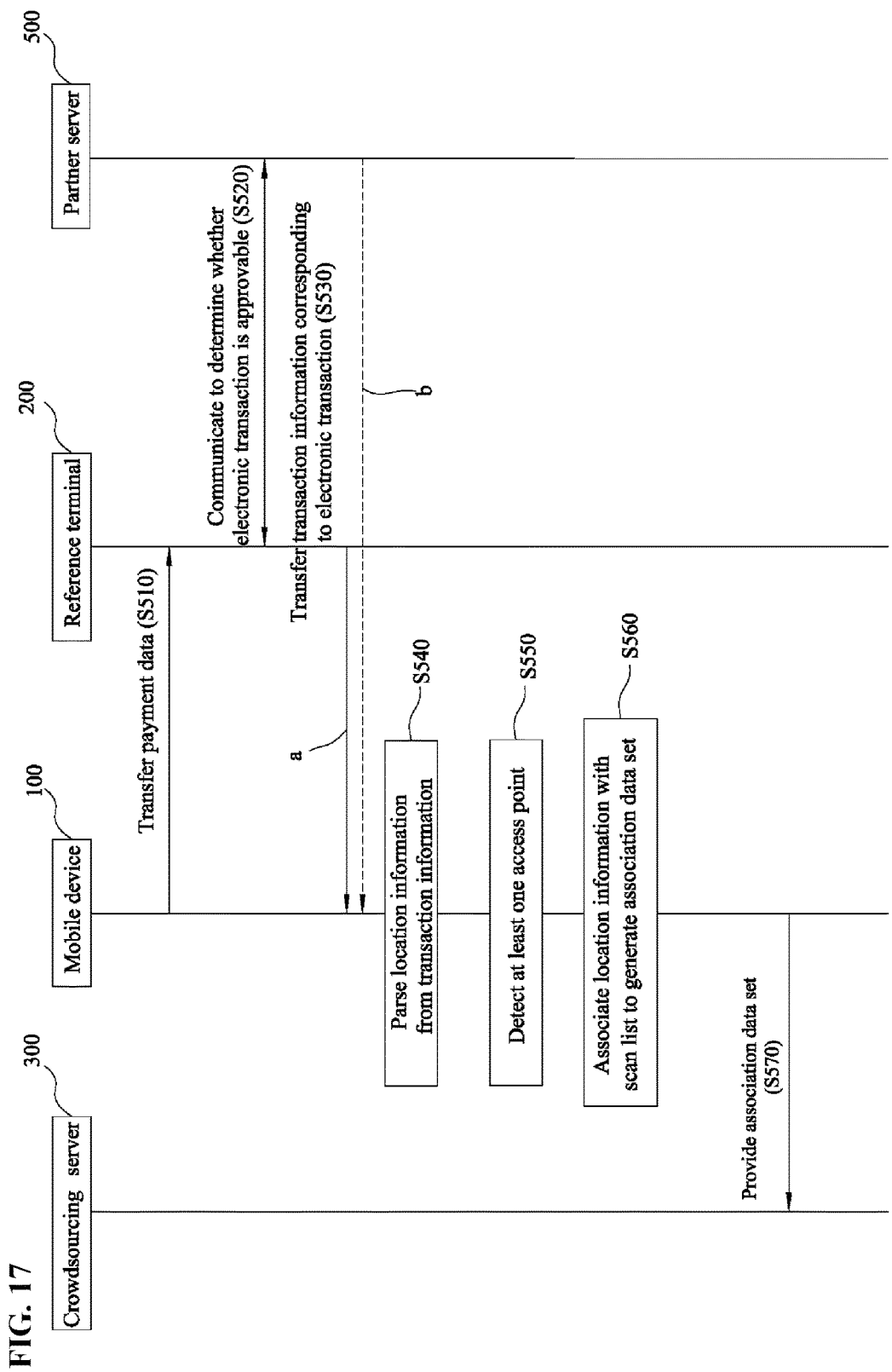
FIG. 17 is an operational flow diagram of providing a proximity service, according to one or more exemplary embodiments.
Figure 18:
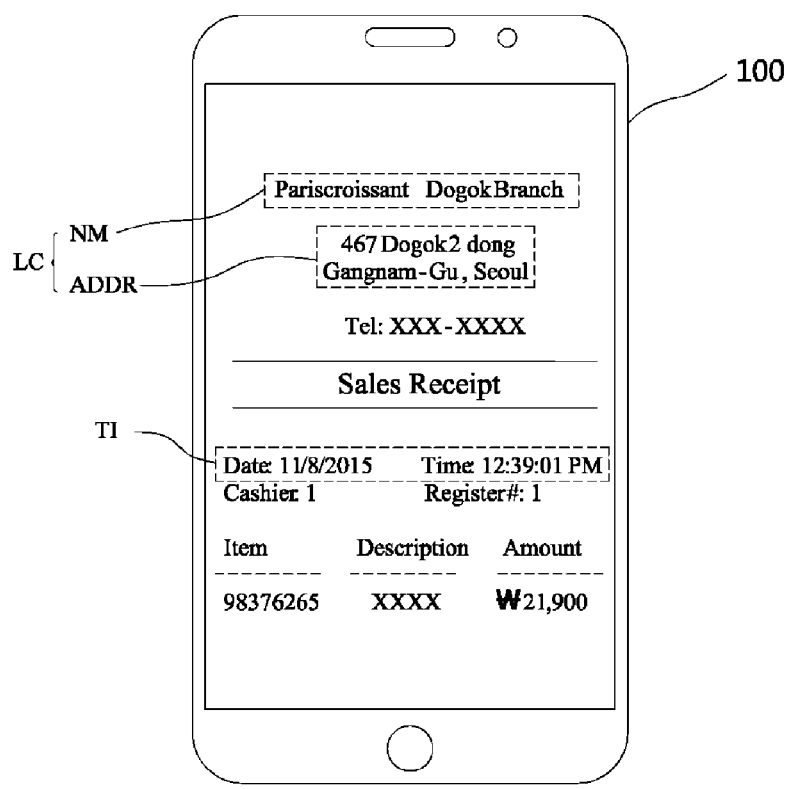
FIG. 18 is a diagram of a mobile device presenting an electronic receipt, according to one or more exemplary embodiments.
Figure 19:
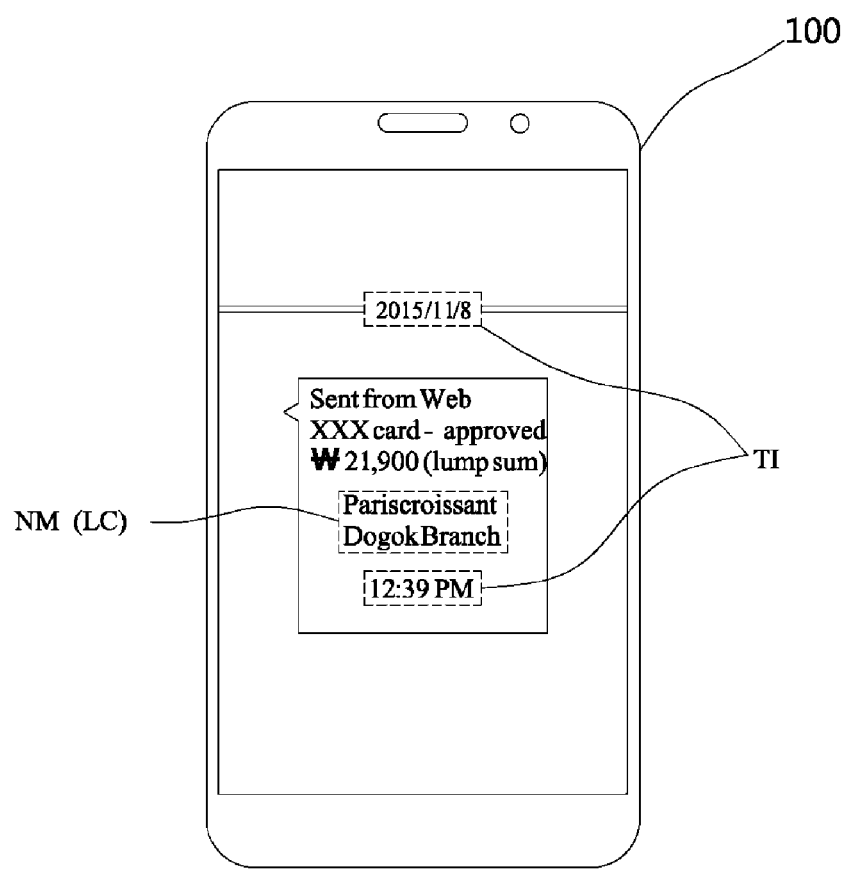
FIGS. 19 and 20 are diagrams of a mobile device presenting text messages, according to one or more exemplary embodiments.
Figure 20:
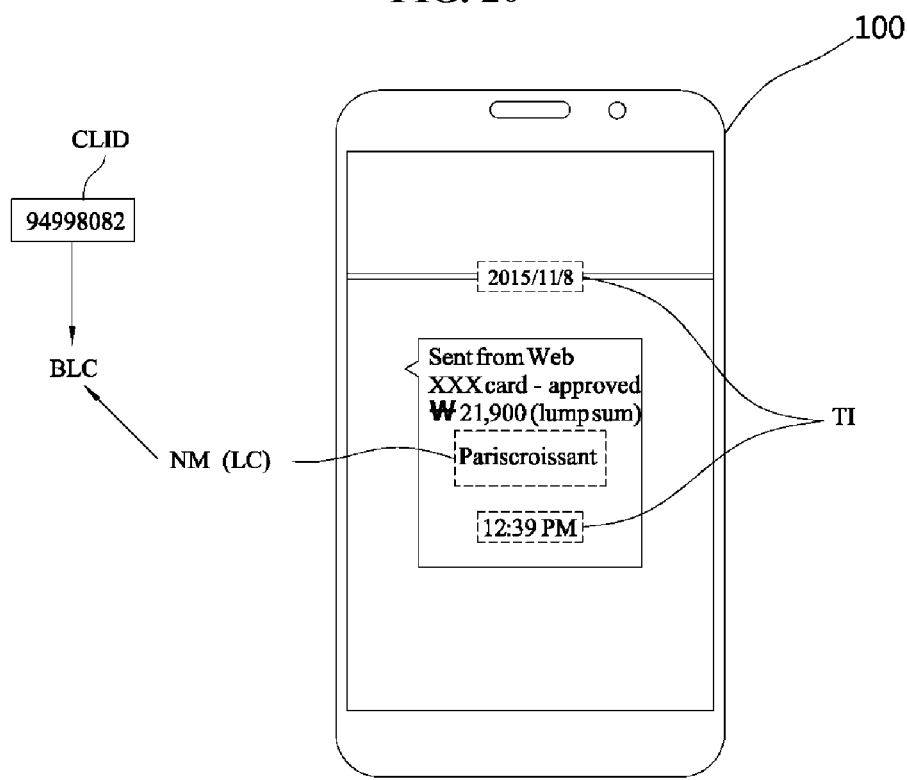

FIG. 17 is an operational flow diagram between mobile device 100, reference terminal 200, and crowdsourcing server 300, according to one or more exemplary embodiments. FIG. 18 is a diagram of mobile device 100 presenting an electronic receipt, according to one or more exemplary embodiments. FIGS. 19 and 20 are diagrams of mobile devices presenting text messages, according to one or more exemplary embodiments.

Referring to FIG. 17, mobile device 100 requests an electronic transaction by transferring payment data to reference terminal 200. (S510) In one or more exemplary embodiments, mobile device 100 may transfer the payment data to reference terminal 200 using the short-wireless communication. For example, mobile device 100 may transfer the payment data using at least one of the near field communication (NFC), the Bluetooth communication, the Wi-Fi communication, the LTE device-to-device (D2D) communication, the magnetic secure transmission (MST) communication, the ZigBee communication, the infrared data association (IrDA) communication, the ultra wideband (UWB) communication, and the pronounced ant plus (Ant+) communication.

In one or more exemplary embodiments, memory 130 (See FIG. 2A) of mobile device 100 may store the payment data, and SoC 120 (See FIG. 2A) may transfer the payment data from memory 130 through communicator 110 (See FIG. 2A) to reference terminal 200.

Reference terminal 200 and partner server 800 communicates to determine whether the electronic transaction is approvable. (S520) Partner server 800 may be a server for managing the electronic transaction connected to reference terminal 200 via a wired network and/or a wireless network. For example, partner server 800 may receive the payment data from reference terminal 200 and determine whether the electronic transaction is approvable according to the payment data.

Mobile device 100 receives a transaction information corresponding to the electronic transaction. (S530) The transaction information may describe information regarding the electronic transaction, such as approval of the electronic transaction, a time of the electronic transaction, and a location of the electronic transaction. The transaction information is provided as the descriptor as described with reference to FIG. 1.

In one or more exemplary embodiments, the transaction information may be provided by reference terminal 200 (path a). The transaction information may be transferred to reference terminal 200 from partner server 800, and reference terminal 200 may transmit the corresponding transaction information to mobile device 100.

In one or more exemplary embodiments, the transaction information may be provided by partner server 800 (path b). Partner server 800 may provide the transaction information to mobile device 100 by communicating with at least one of cellular telecommunication unit 111 and/or short-range wireless communication unit 112 of mobile device 100.

Mobile device 100 parses the location information from the transaction information. (S540) Referring to FIG. 18, mobile device 100 may receive the transaction information as the electronic receipt. The electronic receipt may include at least one of a name NM indicating the location corresponding to reference terminal 200 and address ADDR indicating the location. Mobile device 100 may parse at least one of name NM and address ADDR to obtain location information LC. The electronic receipt may include time information TI which corresponds with the electronic transaction. In one or more exemplary embodiments, mobile device 100 may obtain time stamp TMST described with reference to FIG. 9 by parsing time information TI.

Referring to FIG. 19, mobile device 100 may receive the transaction information as a text message. The text message may include name NM indicating the location of reference terminal 200, which may be parsed as location information LC. The text message may include time information TI corresponding to the electronic transaction, which may be parsed as time stamp TMST.

Referring to FIG. 20, name NM received by mobile device 100 may not include a detail location (for example, Dogok branch) of the transaction. Accordingly to the exemplary embodiment of FIG. 20, name NM does not include the detail location, and therefore, location information LC (See FIG. 9) may not include the information (See JC in FIG. 12) for specifying the detail location. For example, location information LC may include information for specifying a merchant (see UUID in FIG. 12) but may not include the information for specifying the detail location. In such case, the detail location may be defined by cellular ID CLID (See FIG. 12) included in scan list SL (see FIG. 9). For example, cellular ID CLID '94998082' may mean that the detail location is 'Dogok branch.' Accordingly, crowdsourcing server 300 may additionally include and/or be connected via network to a database including information for mapping cellular ID CLID to the detail location. Crowdsourcing server 300 may generate base location information BLC based on location information LC and cellular ID CLID.

The text included in the transaction information may be arranged in various manners. Application processor 122 (See FIG. 2A) included in mobile device 100 may include elements for parsing the corresponding text arranged in various manners.

Referring back to FIG. 17, mobile device 100 detects at least one access point to generate scan list SL. (S550) Mobile device 100 associates location information LC and scan list to generate association data set ADS. (S560) Mobile device 100 provides association data set ADS to crowdsourcing server 300. (S570)

Figure 21:
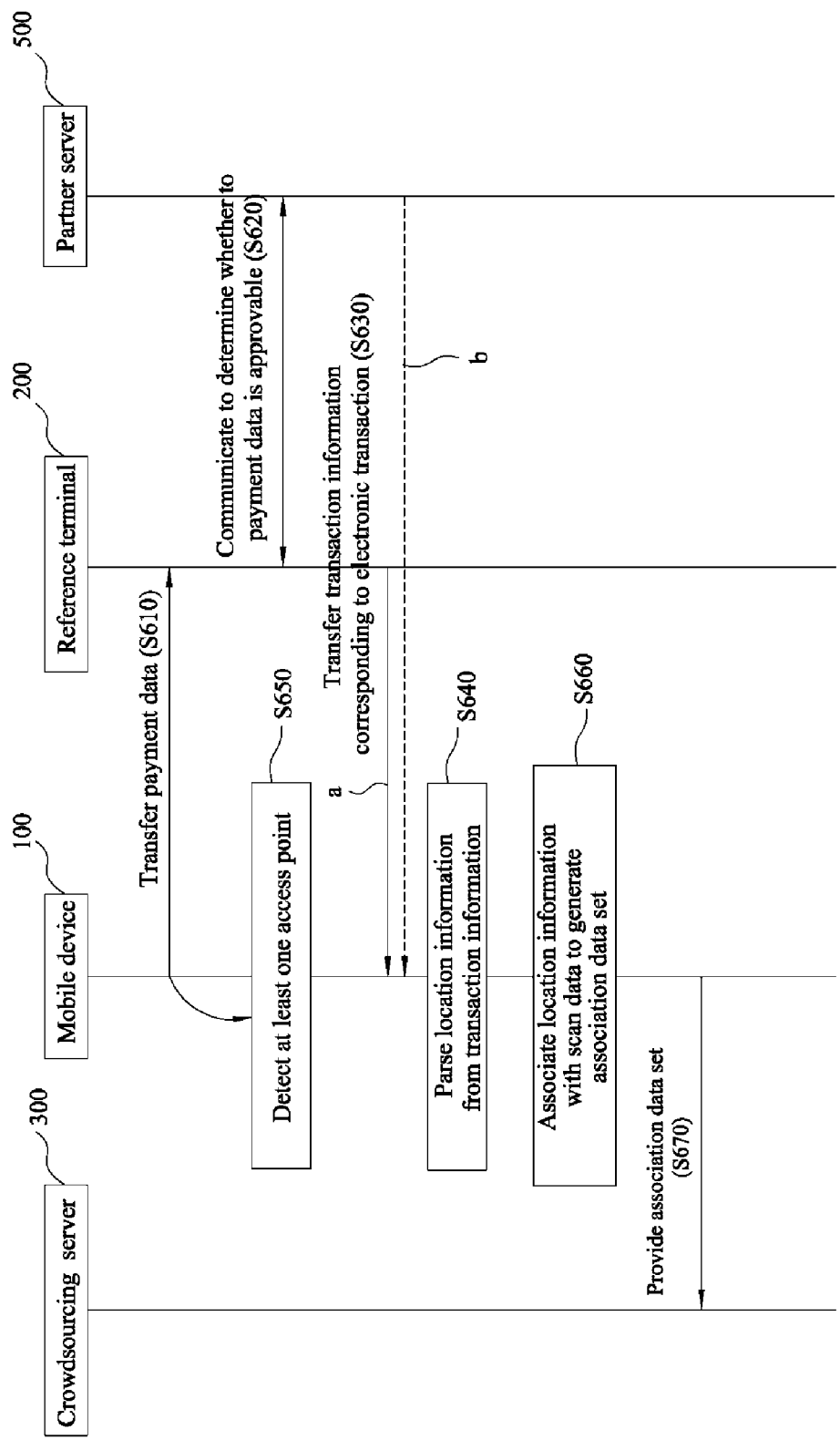
FIG. 21 is an operational flow diagram of providing a proximity service, according to one or more exemplary embodiments.

FIG. 21 is an operational flow diagram between mobile device 100, reference terminal 200, and crowdsourcing server 300, according to one or more exemplary embodiments.

Referring to FIG. 21, descriptions for steps S610 to S640, S660, and S670 are similar to the descriptions for steps S510 to S540, S560, and S570 with reference to FIG. 17, respectively. Hereinafter, overlapping description will be omitted.

In response to receiving the payment data, mobile device 100 detects at least one access point which is accessible. (S650) In one or more exemplary embodiments, SoC 120 (See FIG. 2A) may detect nearby access points through communicator 110 (See FIG. 2A), after the payment data stored in memory 130 (See FIG. 2) is transferred to request the electronic transaction and before the transaction information is received. According to one or more exemplary embodiments, the scanning of the access points may overlap at least a part of a time between requesting of the electronic transaction and receiving the corresponding transaction information. Therefore, the association data set may be promptly provided.

Figure 22:
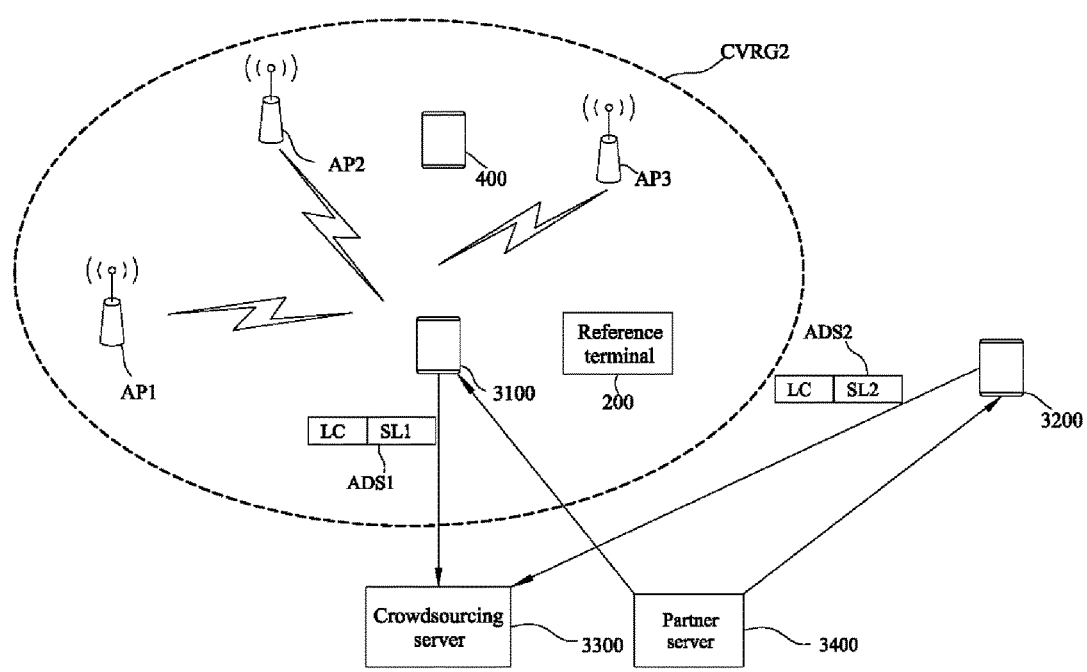
FIG. 22 is a system configured to provide a crowdsourcing service, according to one or more exemplary embodiments.

FIG. 22 is a system configured to provide crowdsourcing services, according to one or more exemplary embodiments.

Referring to FIG. 22, first mobile device 3100 is located in second coverage area CVRG2, and second mobile device 3200 is located outside of second coverage area CVRG2. Each of user of first and second mobile device 3100 and 3200 may perform the electronic transaction through a different transaction terminal. First mobile device 3100 may receive the transaction information of the electronic transaction using a credit card. For example, when the user of first mobile device 3100 requests the electronic transaction to reference terminal 200 using the credit card, reference terminal 200 may inquire an approval of the electronic transaction by communicating with partner server 3400. First mobile device 3100 may receive the transaction information corresponding to reference terminal 200 from partner server 3400. First mobile device 3100 may generate the scan list corresponding to first to third access points AP1 to AP3 and transfer location information LC and scan list SL1, which are extracted from the transaction information, to crowdsourcing server 3300 as first association data set ADS1.

Second mobile device 3200 may receive the transaction information based on the electronic transaction using web. For example, when the user of second mobile device 3200 requests the electronic transaction corresponding to a credit card through web, second mobile device 3200 may receive the transaction information corresponding to reference terminal 200 from partner server 3400. Second mobile device 3200 may generate scan list SL2 corresponding to nearby access points (not shown), and transfer location information LC and scan list SL2, which are extracted from the transaction information, to crowdsourcing server 3300 as a second association data set ADS2.

A location represented by location information LC may correspond with reference terminal 200. It may be considered that access points AP1 to AP3 represented by scan list SL1 from first mobile device 3100 is physically associated with the location represented by location information LC. On the other hand, the access points represented by scan list SL2 from second mobile device 3200 is not physically adjacent to the location represented by location information LC. That is, the access points represented by scan list SL2 is not actually associated with location information LC.

Figure 23:
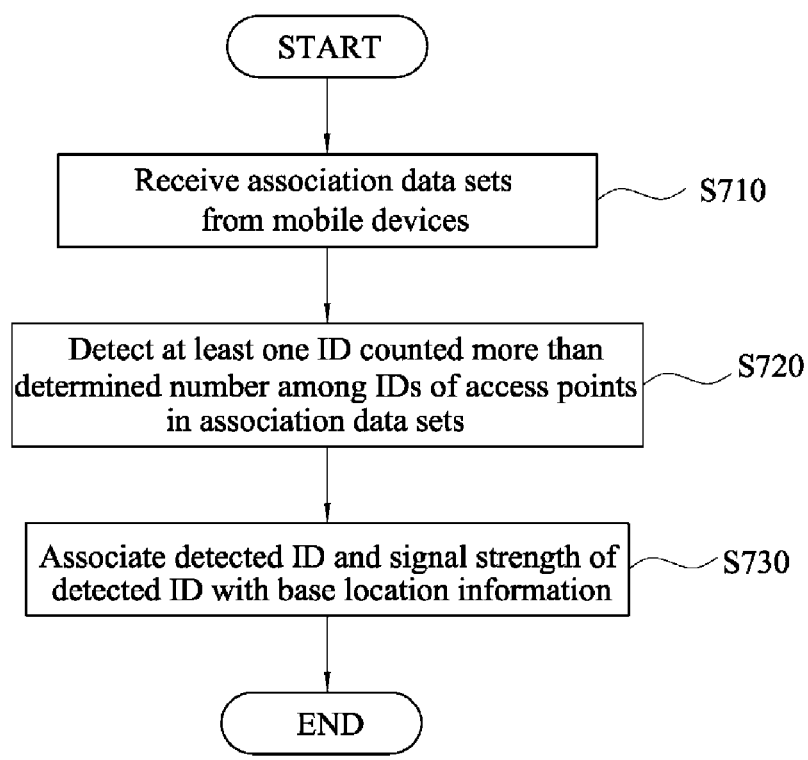
FIG. 23 is a flowchart of a process to provide a crowdsourcing service, according to one or more exemplary embodiments.

FIG. 23 is a flowchart of a process to provide crowdsourcing services via the system of FIG. 22, according to one or more exemplary embodiments. Referring to FIGS. 22 and 23, crowdsourcing server 3300 receives association data sets ADS1 and ADS2, allegedly corresponding to location information LC, from first and second mobile devices 3100 and 3200. (S710) In one or more exemplary embodiments, crowdsourcing server 3300 may collect association data sets ADS1 and ADS2 corresponding to same location information LC during a certain period of time.

Crowdsourcing server 3300 may detect IDs of access points obtained from scan lists SL1 and SL2 that are counted more than a predetermined number. (S720) For example, crowdsourcing server 3300 may detect IDs in two scan lists SL1 and SL2 that are counted more than 2.

When a plurality of users repeatedly requests the electronic transactions at the location of reference terminal 200 and association data sets ADS are generated, association data sets ADS may includes an ID of a same access point. Crowdsourcing server 3300 may determine that the ID of the access point that are counted more than a predetermined number are adjacent to reference terminal 200.

When a user requests the electronic transaction through web at a distant location and corresponding association data sets are generated, each of the association data sets may include IDs of access point that are not adjacent to reference terminal 200. Crowdsourcing server 3300 may determine that the ID of the access point that are counted less than the predetermined number are not adjacent to reference terminal 200.

The detected ID and a signal strength corresponding to the detected ID is associated with the corresponding base location information. (S730)

According to one or more exemplary embodiments, even when some of the electronic transaction may not use the short-range wireless communication, the reliability of the base association data set based on the crowdsourcing may be improved.

Figure 24:
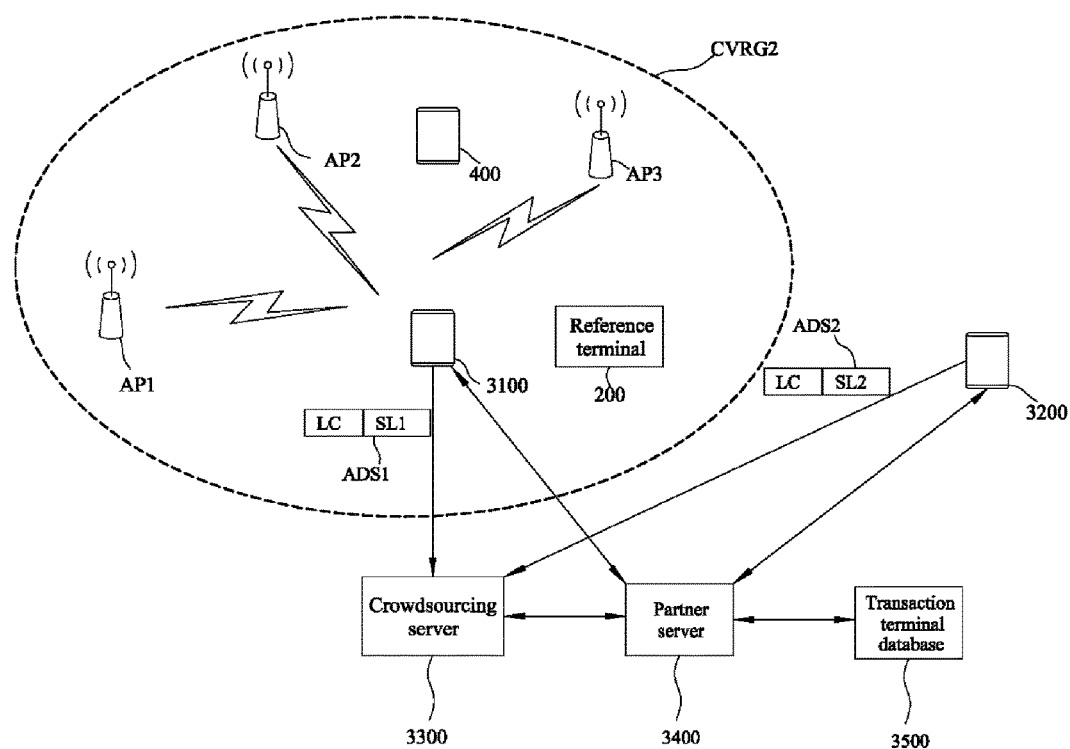
FIG. 24 is a system configured to provide a crowdsourcing service, according to one or more exemplary embodiments.

FIG. 24 is a system configured to provide crowdsourcing services, according to one or more exemplary embodiments.

Referring to FIG. 24, transaction terminal database 3500 is further provided compared to FIG. 22. Hereinafter, overlapping descriptions will be omitted.

Transaction terminal database 3500 stores terminal information representing whether an ID of each transaction terminal corresponds to on-line or off-line, as a mapping table. When partner server 3400 transfers the ID of the transaction terminal to transaction terminal database 3500, transaction terminal database 3500 may transfer back the terminal information indicating whether the corresponding transaction terminal corresponds the on-line or the off-line, back to partner server 3400. For example, when the ID of reference terminal 200 is received, transaction terminal database 3500 may transfer back the terminal information indicating that the ID corresponds to the off-line. For example, when the ID of a certain transaction terminal on the internet is received, transaction terminal database 3500 may transfer back the terminal information indicating that the ID corresponds to the on-line.

In one or more exemplary embodiments, transaction terminal database 3500 may be separately provided from partner server 3400. In one or more exemplary embodiments, transaction terminal database 3500 may be provided as a component of partner server 3400.

Partner server 3400 may provide the terminal information to crowdsourcing server 3300 and/or first and second mobile devices 3100 and 3200.

Figure 25:
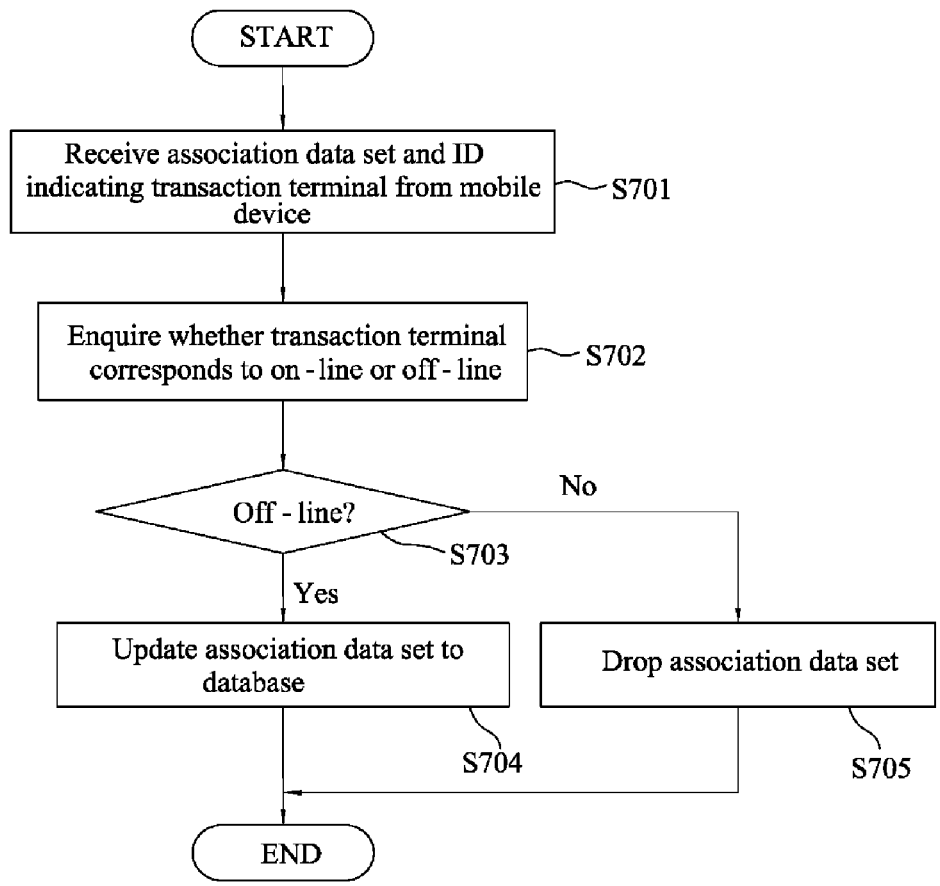
FIGS. 25 and 26 are flowcharts of a process to provide a crowdsourcing service, according to one or more exemplary embodiments.
Figure 26:
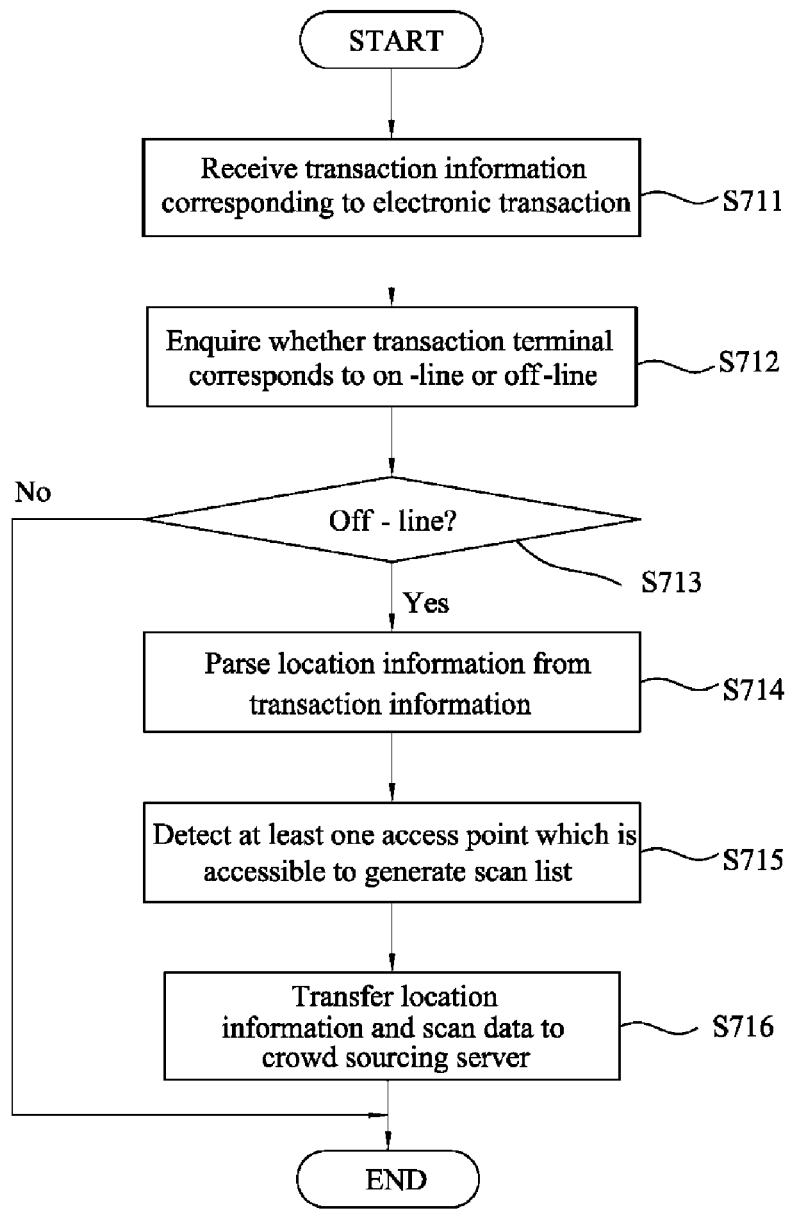

FIGS. 25 and 26 are flowcharts of processes to provide crowdsourcing services via the system of in FIG. 24, according to one or more exemplary embodiments.

Referring to FIG. 24 and FIG. 25, crowdsourcing server 3300 receives the ID of the transaction terminal with association data set ADS. (S701)

In one or more embodiments, the transaction information received by the mobile device may include the ID of the transaction terminal. In one or more embodiments, partner server 3400 may recognize the ID of the transaction terminal when the partner server 3400 communicates with the transaction terminal. For example, the electronic receipt and the text massages described with reference to FIGS. 18, 19, and 20 may further include a field for representing the ID of the transaction terminal. The corresponding mobile device may extract the ID of the transaction terminal from the transaction information and provide the extracted ID to crowdsourcing server 3300 with association data set ADS.

Crowdsourcing server 3300 transfers the ID of the transaction terminal to partner server 3400 to enquire whether the transaction terminal corresponds to the on-line or the off-line. (S702) Partner server 3400 may transfer the ID of the transaction terminal to transaction terminal database 3500 and receive the terminal information from transaction terminal database 3500. Partner server 3400 may transfer back the terminal information to crowdsourcing server 3300.

Crowdsourcing server 3300 performs step S704 if the transaction terminal corresponds to the off-line, and performs step S705 if the transaction terminal corresponds to the on-line. (S703)

If the transaction terminal corresponds to the off-line, crowdsourcing server 3300 updates the association data set to database 340 (See FIG. 5). (S704) If the transaction terminal correspond to the on-line, crowdsourcing server 3300 drops the association data set. (S705) That is, the association data set is not updated to database 340.

According to one or more exemplary embodiments, even when some of the electronic transaction may not use the short-range wireless communication, the reliability of the base association data set based on the crowdsourcing may be improved.

Referring to FIG. 24 and FIG. 26, each mobile device receives the transaction information corresponding to the electronic transaction. (S711) The mobile device transfers the ID of the transaction terminal, which is in the transaction information, to enquire whether the transaction terminal corresponds to the on-line or the off-line. (S712) For example, SoC 120 (See FIG. 2A) in the mobile device may extract the ID of the transaction terminal from the transaction information and transfer the corresponding ID to partner server 3400 through communicator 110 (See FIG. 2A). Partner server 3400 may communicate with transaction terminal database 3500 to obtain the terminal information, and transfer back the terminal information to the mobile device.

The mobile device performs steps S714, S715, and S716 if the transaction terminal corresponds to the off-line. (S713) If the transaction terminal corresponds to the off-line, the mobile device do not provide the location information and the scan list to crowdsourcing server 3300.

The descriptions for steps S714, S715, and S716 are similar to the descriptions for steps S540 to S570 described with reference to FIG. 7, respectively. Hereinafter overlapping description will be omitted.

According to one or more exemplary embodiments, the mobile device may selectively perform the crowdsourcing when the electronic transaction does not use the short-range wireless communication. Therefore, the reliability of the base association data set based on the crowdsourcing may be improved.

Figure 27:
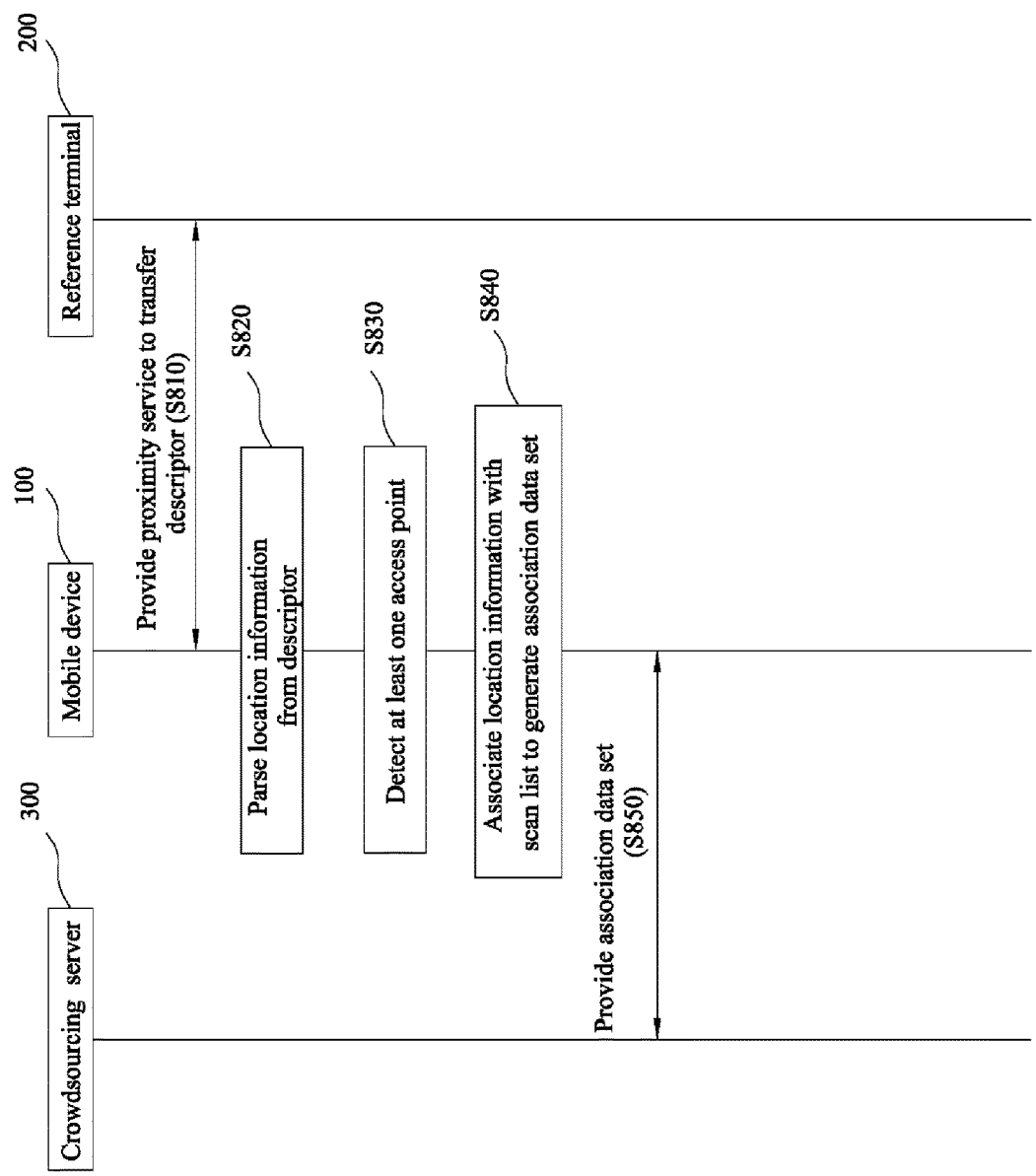
FIG. 27 is an operational flow diagram of providing a proximity service, according to one or more exemplary embodiments.

FIG. 27 is an operational flow diagram between mobile device 100, reference terminal 200, and crowdsourcing server 300, according to one or more exemplary embodiments.

The descriptions for steps S820 to S850 are similar to the descriptions for steps S540 to S570 described with reference to FIG. 17, respectively. Hereinafter, overlapping description will be omitted.

Referring to FIG. 27, reference terminal 200 provides the descriptor to mobile device 100 through the proximity service in coverage area CVRG1. (S810) Reference terminal 200 may provide the descriptor including the location information to mobile device 100 through the short-range wireless communication such as the near field communication (NFC), the Bluetooth communication, the Wi-Fi communication, the LTE device-to-device (D2D) communication, the magnetic secure transmission (MST) communication, the ZigBee communication, the infrared data association (IrDA) communication, the ultra wideband (UWB) communication, and the pronounced ant plus (Ant+) communication.

According to one or more exemplary embodiments of the crowdsourcing method, the proximity service provided by reference terminal 200 in first coverage area CVRG1 may extend to second coverage area CVRG2 shown in FIG. 2. The location information provided to first mobile device 100 from reference terminal 200 may be provided through crowdsourcing server 300 to second mobile device 400. Crowdsourcing server 300 may collect the base association data set according to association data set ADS provided by first mobile device 100, and then provide the base location information to second mobile device 400 when second mobile device 400 transfers the proximity service request including a scan list.

According to one or more embodiments, the mobile device receives the location information associated with the short-range wireless communication with the reference terminal, receives identifications of access points accessible and corresponding signal strengths, and provides the location information, the identifications of access points, and the corresponding signal strengths to the crowdsourcing server as an association data set. The crowdsourcing server accumulates the base location information and the base scan list from the provided association data set. Therefore, the proximity service area may be effectively extended.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A system-on-chip (SoC) comprising:
 a first interface; and
 at least one application processor, configured to:
  receive location information from a communicator, the location information being associated with an electronic transaction;
  obtain a request flag signal corresponding to the location information through the communicator from an external server, the request flag signal indicating whether to provide an association data set corresponding to the location information to the external server;

trigger scanning of at least one access point to the communicator in response to receiving the request flag signal;

receive an identification of the at least one access point from the communicator, the at least one access point being accessible to the communicator;

generate the association data set comprising the location information and the identification of the at least one access point; and transmit the association data set through the communicator to the external server, wherein the first interface is configured to provide communication between the at least one application processor and the communicator.

2. The SoC of claim 1, wherein:

the at least one application processor is further configured to transfer payment data associated with the electronic transaction to the communicator through the first interface;

the communicator is configured to transmit the payment data to a reference terminal via short-range wireless communication; and the location information is received in response to the transmission of the payment data.

3. The SoC of claim 2, wherein:

the at least one application processor is further configured to initiate the communicator to scan for the at least one access point in response to the transmission of the payment data; and the identification of the at least one access point is received in response to the scan.

4. The SoC of claim 2, wherein the location information is provided from the reference terminal.

5. The SoC of claim 2, wherein:

the reference terminal is connected to a third-party server configured to manage the electronic transaction; and the location information is provided from the third-party server.

6. The SoC of claim 1, wherein:

the at least one application processor is configured to initiate the communicator to scan for the at least one access point for a predetermined period of time after reception of the location information; and the identification of the at least one access point is received in response to the scan.

7. The SoC of claim 1, wherein the at least one application processor is further configured to:

receive a transaction information associated with the electronic transaction from the communicator; and determine the location information based on the received transaction information.

8. The SoC of claim 1, wherein:

the at least one application processor is further configured to receive a signal strength from the at least one access point; and the association data set further comprises the signal strength.

9. The SoC of claim 1, wherein:

the at least one application processor is configured to receive transaction information associated with the electronic transaction from the communicator through the first interface, the transaction information including the location information; and the at least one application processor is further configured to:

generate a time stamp corresponding to a time that the electronic transaction is performed, a time that the location information is received, or a time information in the transaction information; and transmit the time stamp to the communicator through the first interface.

10. The SoC of claim 1, wherein:

the at least one application processor further configured to generate a time stamp corresponding to a time associated with reception of the identification of the at least one access point; and the association data set further comprises the time stamp.

11. The SoC of claim 1, further comprising:

a second interface configured to provide communication between the at least one application processor and a memory, wherein the at least one processor is further configured to:

store the location information and the identification of the at least one access point in the memory; and receive the location information and the identification of the at least one access point from the memory to generate the association data set.

12. A system-on-chip (SoC) comprising:

an interface; and at least one application processor configured to:

receive location information from a communicator, the location information being associated with short-range wireless communication between the communicator and a reference terminal;

obtain a request flag signal corresponding to the location information through the communicator from an external server, the request flag signal indicating whether to provide an association data set corresponding to the location information to the external server;

trigger scanning of at least one access point to the communicator in response to receiving the request flag signal;

receive an identification of the at least one access point from the communicator, the at least one access point being accessible to the communicator;

generate the association data set comprising the location information and the identification of the access point; and transmit the association data set through the communicator to the external server, wherein the interface is configured to provide communication between the at least one application processor and the communicator.

13. The SoC of claim 12, wherein:

the at least one application processor is further configured to transfer payment data associated with an electronic transaction to the communicator through the interface;

the communicator is configured to transmit the payment data to the reference terminal via the short-range wireless communication; and the location information is received in response to the transmission of the payment data.

14. The SoC of claim 12, wherein the location information is associated with a proximity service provided from the reference terminal.

* * * * *